US006952863B2

(12) United States Patent
Draggoo et al.

(10) Patent No.: US 6,952,863 B2
(45) Date of Patent: Oct. 11, 2005

(54) TETHER CLIP SYSTEM

(75) Inventors: Kraig D. Draggoo, Oakland, MI (US); Eric D. Hyp, Aspers, PA (US); Loc B. Tieu, Exton, PA (US); David A. Minnich, Wilmington, DE (US); William E. Sokurenko, Glen Mills, PA (US)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 10/289,669

(22) Filed: Nov. 6, 2002

(65) Prior Publication Data

US 2004/0052575 A1 Mar. 18, 2004

Related U.S. Application Data

(63) Continuation-in-part of application No. 10/263,875, filed on Oct. 2, 2002, which is a continuation-in-part of application No. 10/243,803, filed on Sep. 13, 2002.

(51) Int. Cl.[7] .................................................. F16B 5/00
(52) U.S. Cl. .......................................... 24/297; 24/453
(58) Field of Search ........................... 24/297, 453, 602, 24/326, 581.11; 411/508–510; 174/138 D, 138 G; 296/214, 146.7; 403/326, 408.1

(56) References Cited

U.S. PATENT DOCUMENTS

| 916,995 A | * | 4/1909 | Carr ............................ 24/623 |
| 5,647,607 A | | 7/1997 | Bolieau |
| 5,651,562 A | * | 7/1997 | Hagen et al. ............. 280/728.3 |
| 5,687,458 A | | 11/1997 | Coker |
| 5,758,987 A | | 6/1998 | Frame et al. |
| 5,845,935 A | | 12/1998 | Enders et al. |
| 5,851,097 A | | 12/1998 | Shereyk et al. |
| 6,042,296 A | | 3/2000 | Wittig et al. |
| 6,131,943 A | | 10/2000 | Breitweg |
| 6,283,498 B1 | | 9/2001 | Breitweg |
| 6,298,526 B1 | | 10/2001 | Baumdicker et al. |
| 6,431,585 B1 | * | 8/2002 | Rickabus et al. ......... 280/728.3 |
| 6,457,217 B2 | * | 10/2002 | Yoshii et al. ................ 24/297 |
| 6,581,252 B1 | * | 6/2003 | Sedlock et al. ............... 24/297 |

FOREIGN PATENT DOCUMENTS

| FR | 2818706 A1 | * | 6/2002 | ............. F16B/2/22 |
| JP | 2000255370 A | * | 9/2000 | ........... B60R/21/22 |
| JP | 2000318657 A | * | 11/2000 | ........... B62D/27/06 |
| JP | 2001018731 A | * | 1/2001 | ........... B60R/13/02 |
| JP | 2001165134 A | * | 6/2001 | ........... F16B/19/10 |
| JP | 2001277985 A | * | 10/2001 | ........... B60R/21/20 |
| JP | 2002067856 A | * | 3/2002 | ........... B60R/21/20 |

* cited by examiner

Primary Examiner—James R. Brittain
(74) Attorney, Agent, or Firm—Paul & Paul

(57) ABSTRACT

Reliable and durable tether clips that continue to tether two panels together while allowing for a controlled displacement between the two panels in response to a predetermined force are disclosed. The tether clips according to the present invention include a first retaining means near a first end that is adapted to be securable to a first panel, a second retaining means that is engageable with the second panel and limits the relative separation between the panels, and a releasable fastener means intermediate the first and second retaining means that normally maintains the two panels in a closed configuration relative to one another but that releases at least one of the panels relative to the other panel in response to a predetermined force tending to separate the panels.

9 Claims, 20 Drawing Sheets

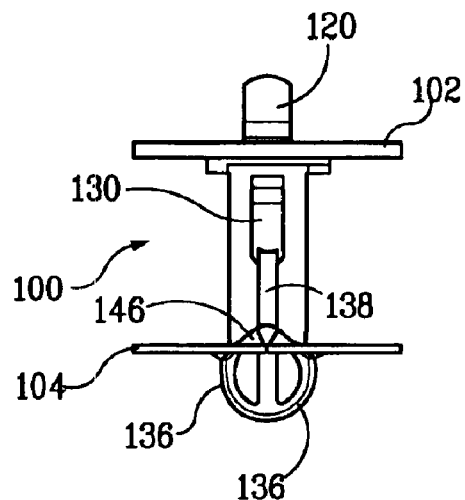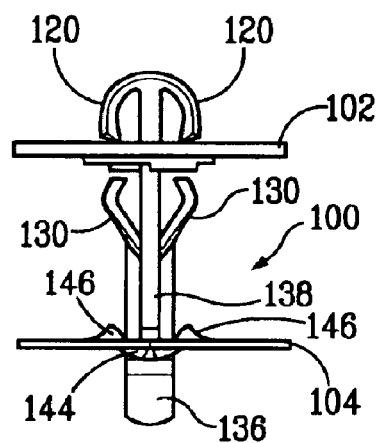
FIG. 5        FIG. 6
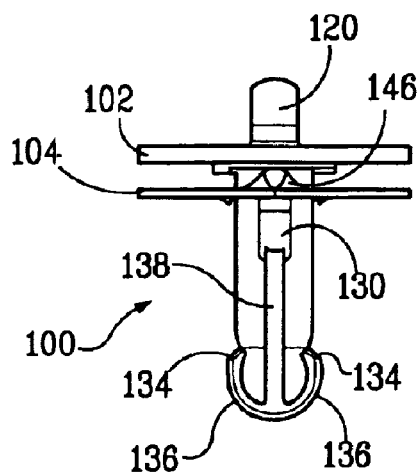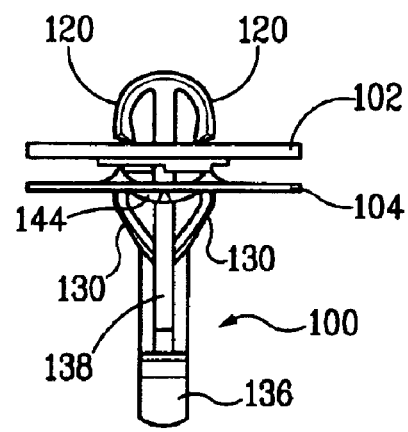
FIG. 7        FIG. 8

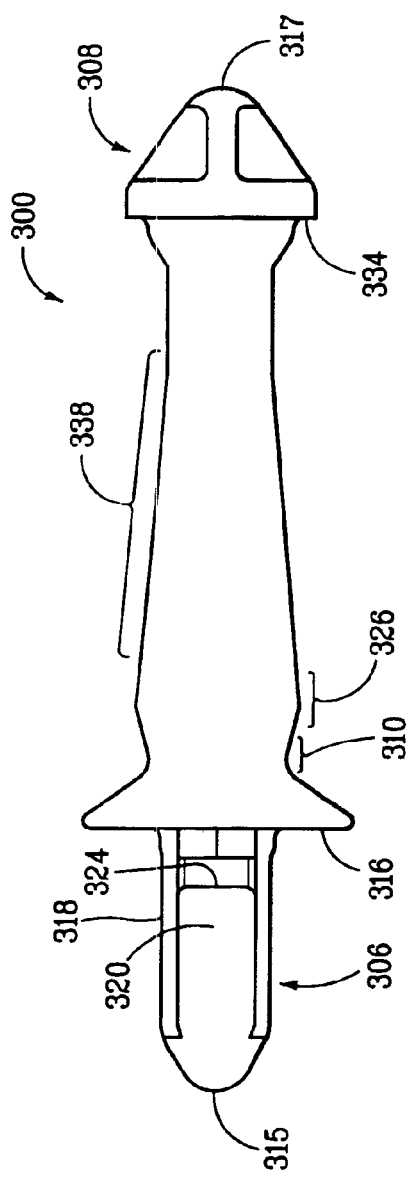
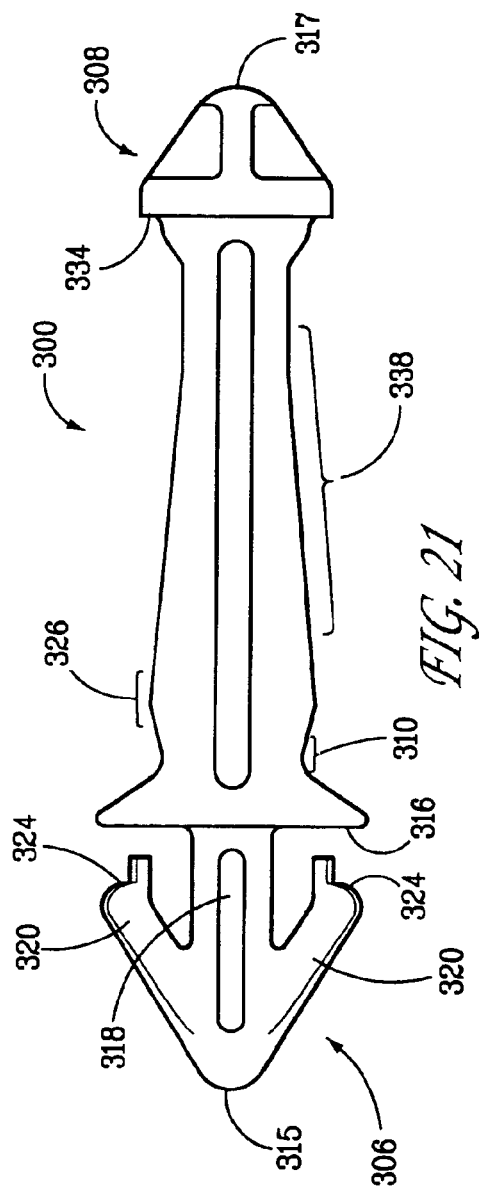

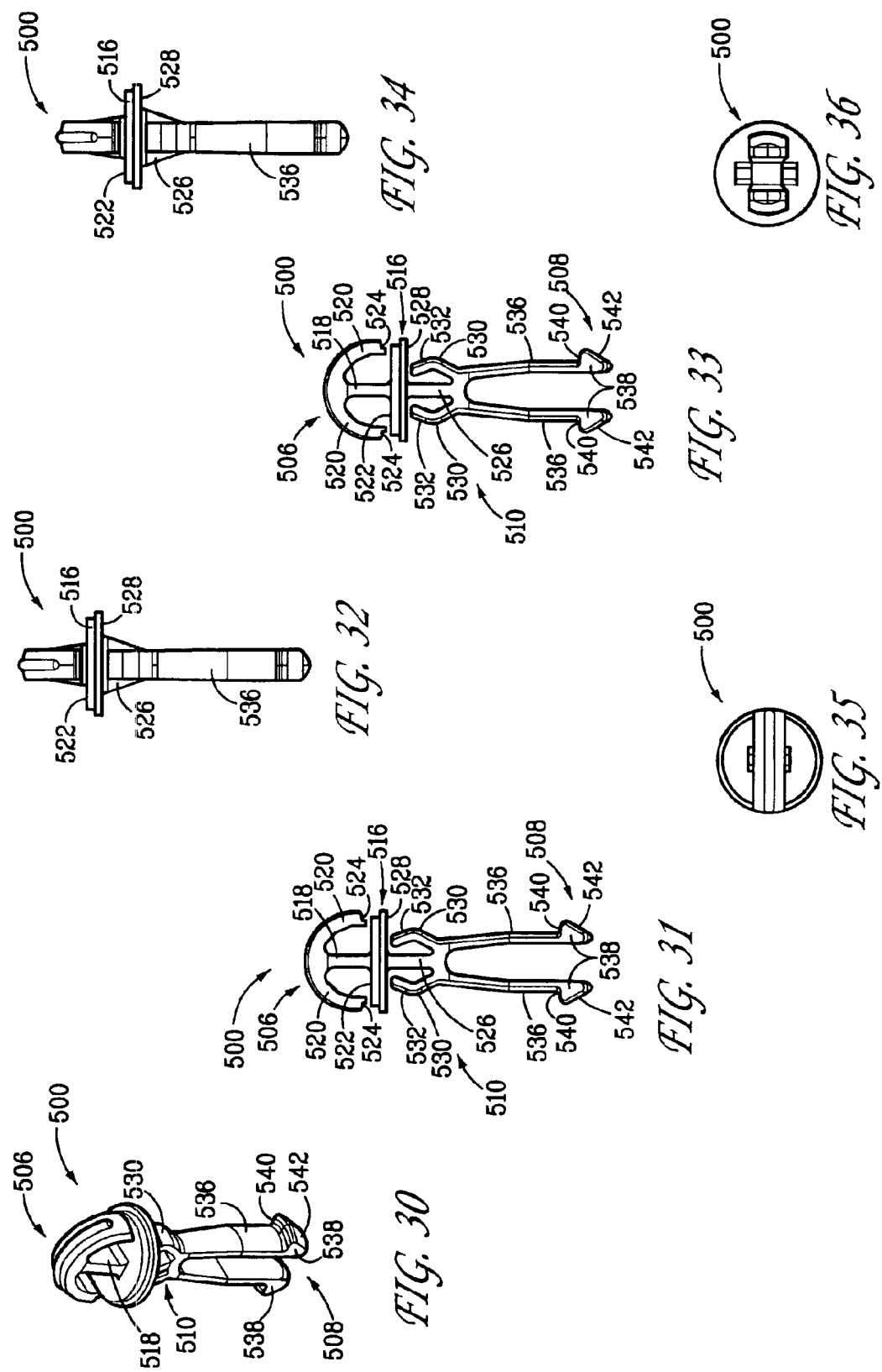

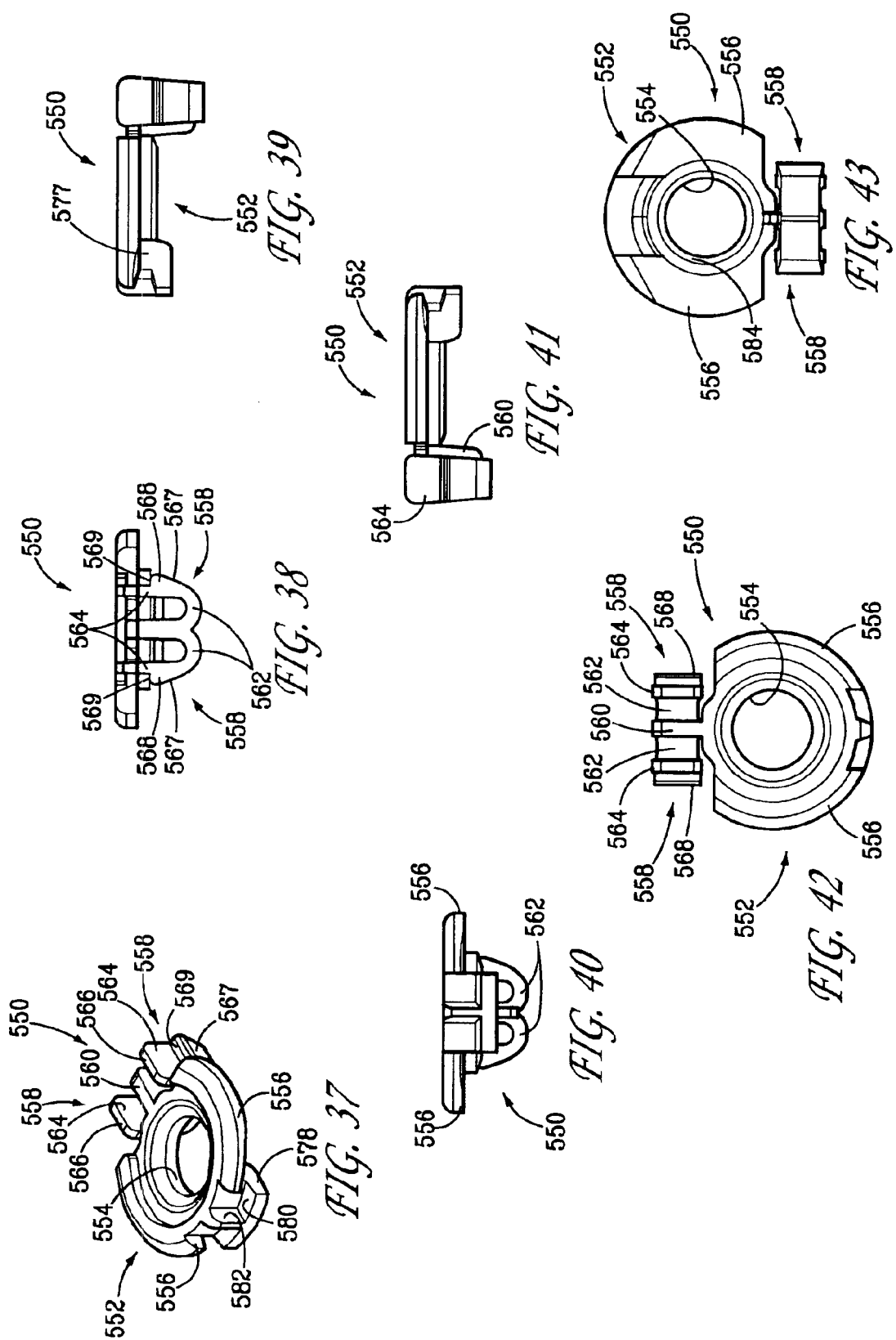

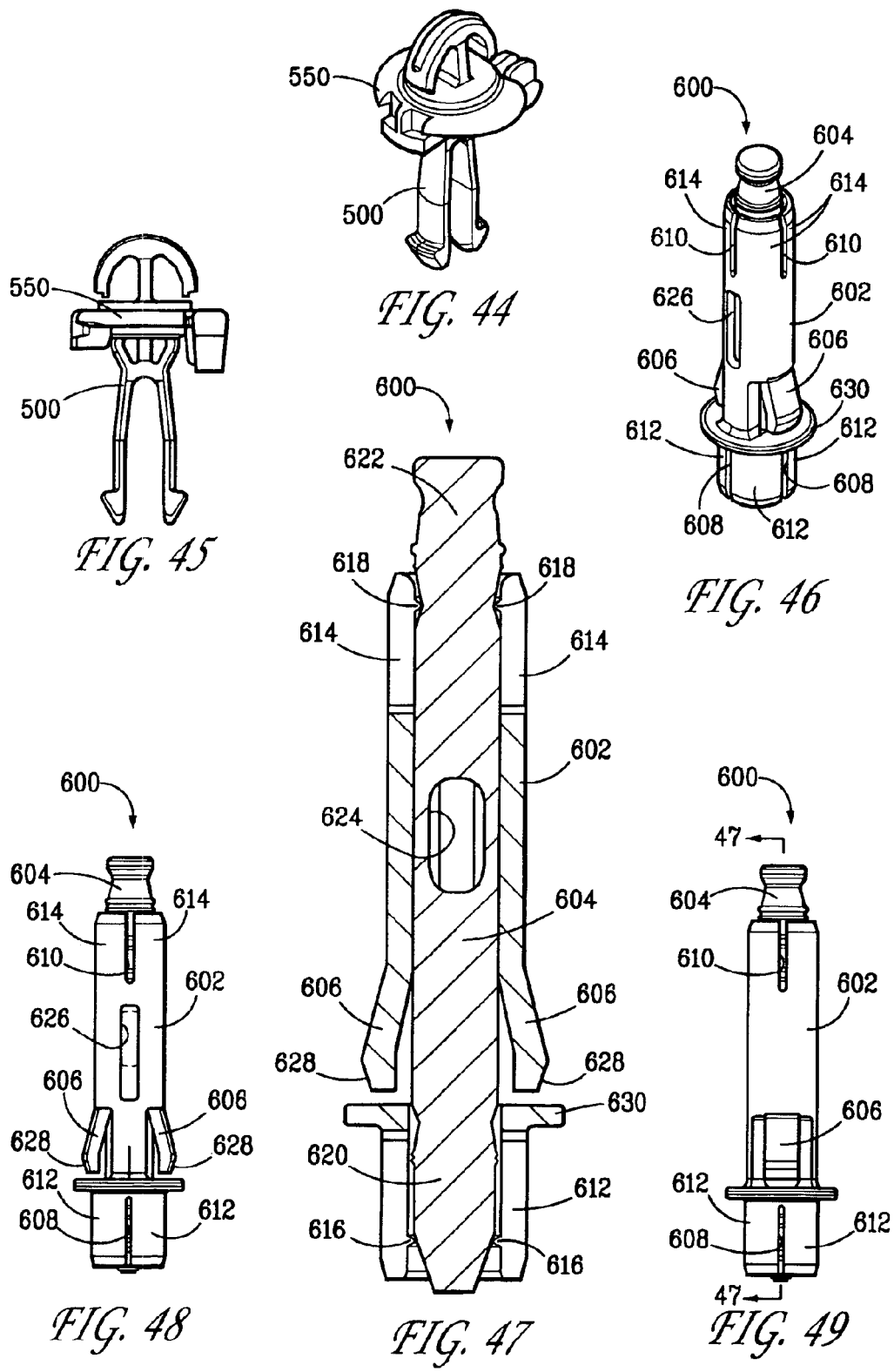

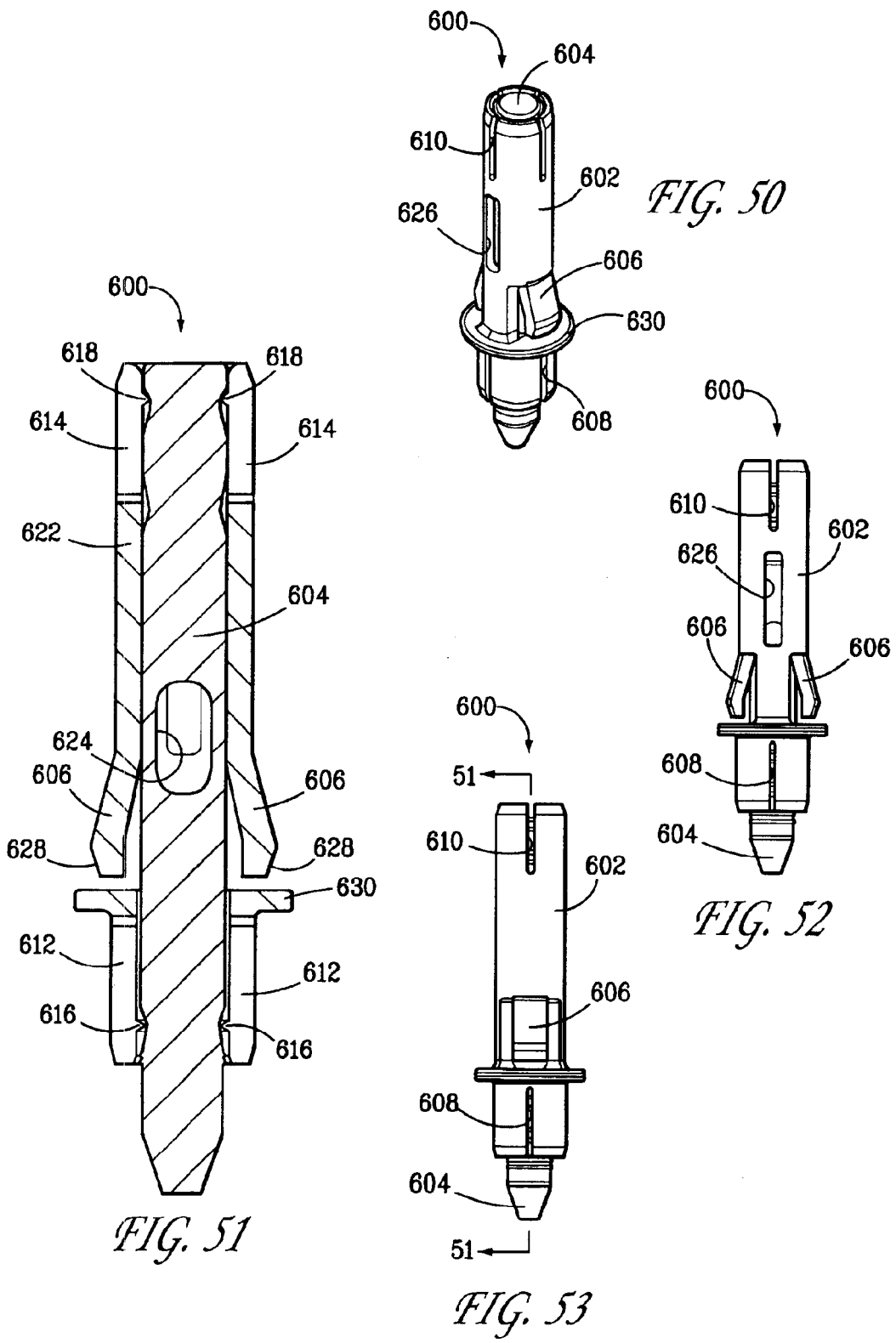

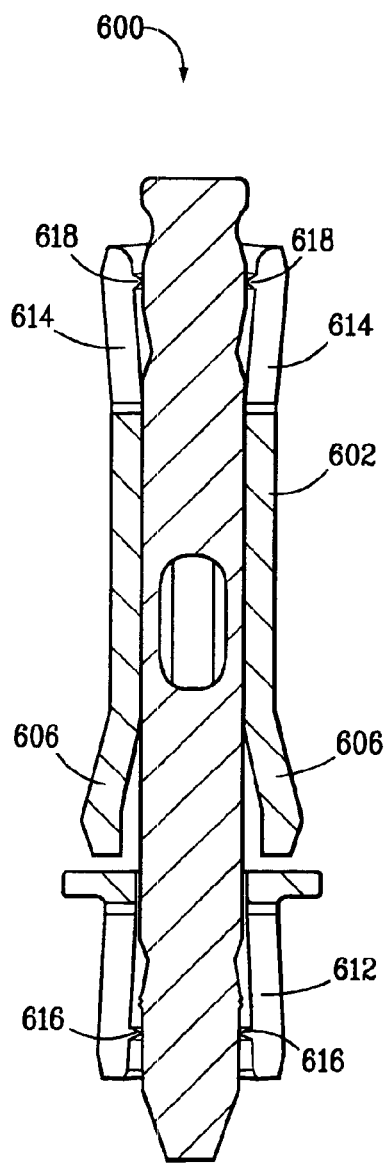
FIG. 55
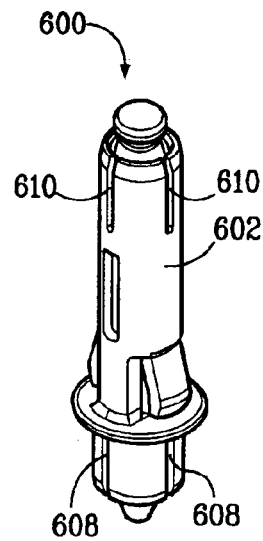
FIG. 54
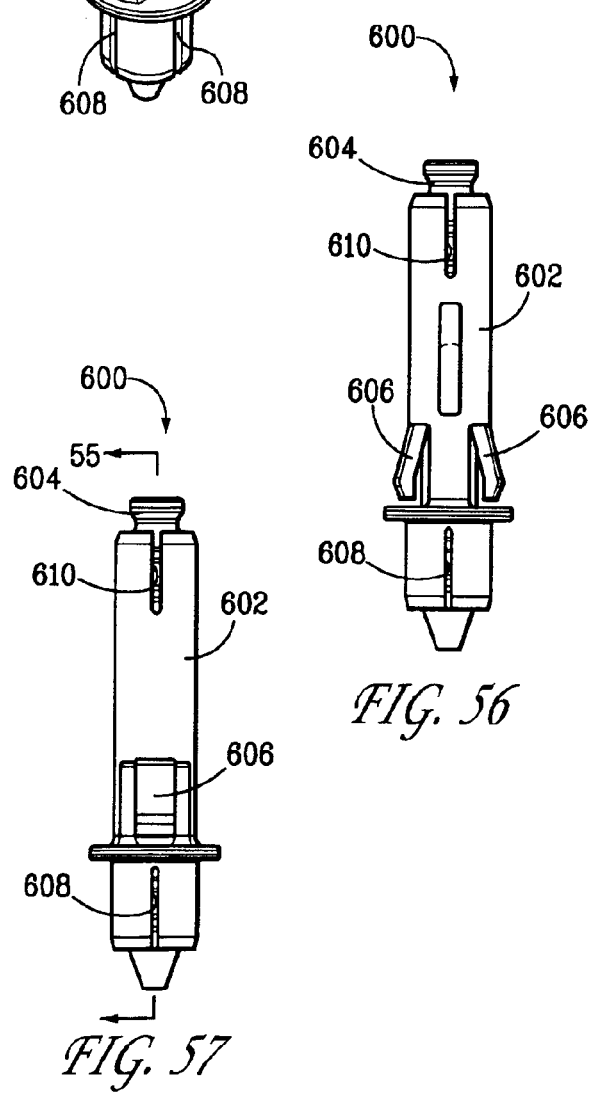
FIG. 56
FIG. 57

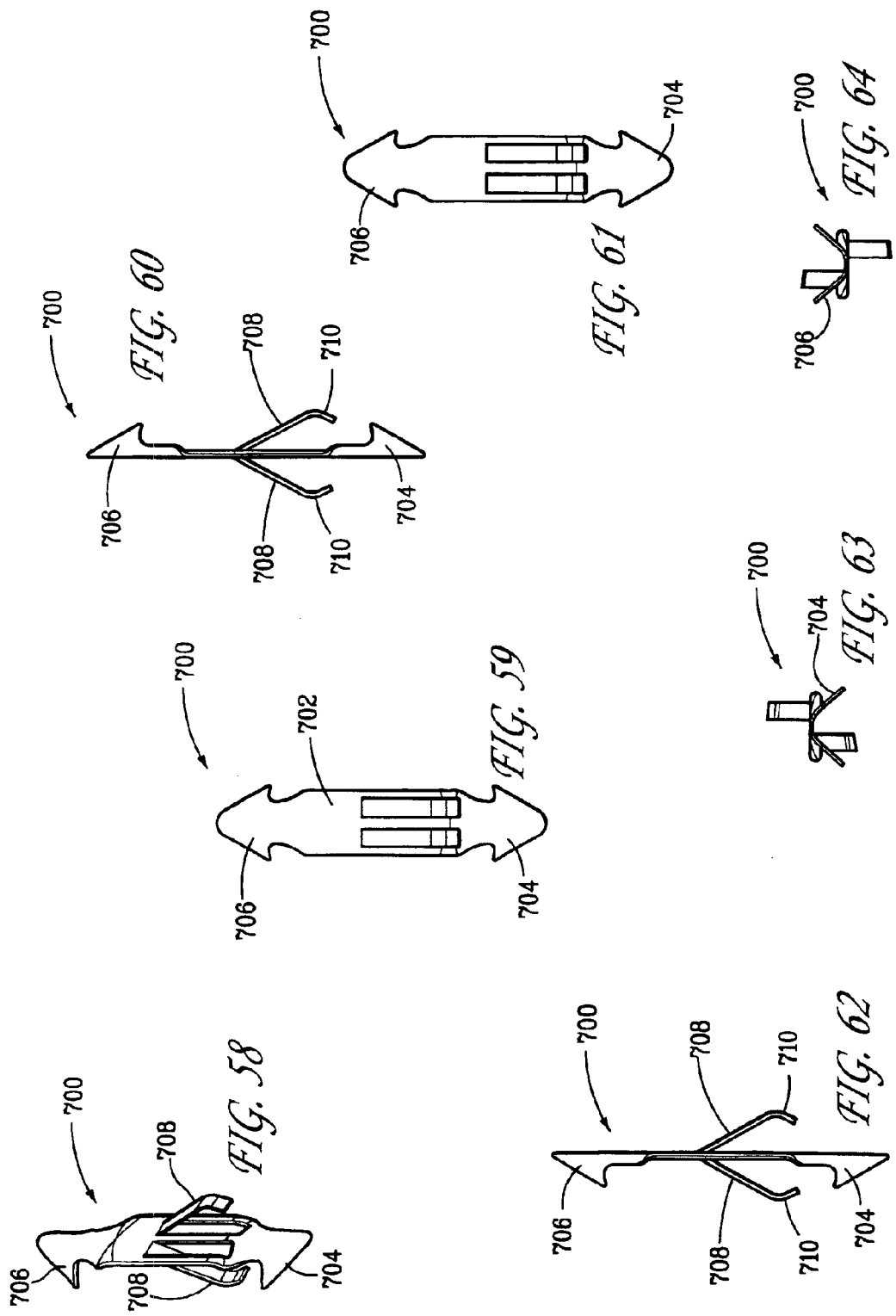

TETHER CLIP SYSTEM

CROSS-REFERENCE TO RELATED APPLICATIONS

This patent application is a continuation-in-part of U.S. patent application Ser. No. 10/263,875, filed on Oct. 2, 2002, which is a continuation-in-part of U.S. patent application Ser. No. 10/243,803, filed on Sep. 13, 2002.

BACKGROUND OF THE INVENTION

1. Field of Invention

This invention relates generally to a panel fastener or clip that normally fastens two panels together but allows for a predetermined displacement between the panels in response to a predetermined force applied to the panels.

2. Brief Description of the Related Art

In many applications the need arises to fasten one panel to another. For example, in the automotive industry the interior door panels of the vehicle must be securely fastened to the sheet metal forming part of the vehicle door. Many fasteners for this purpose have been proposed in the art. Examples of such panel fasteners can be seen in U.S. Pat. Nos. 5,758,987 and 6,042,296. However, there remains a need in the art for panel fasteners that, while securing two panels together under normal circumstances, will also allow for a controlled displacement between the two panels in response to the application of a predetermined force. An example, of an application requiring this type of fastener is in cars having side airbags that are concealed by the interior door panels. In such cars, when the side airbag inflates in an accident, the panels must be allowed to be displaced relative to one another to allow the airbag to be deployed properly, however, the panels should not be allowed to become completely disconnected. If an interior panel is allowed to separate completely upon deployment of the airbag, then the loose panel could act as a projectile that can cause injury to a vehicle's occupants. Furthermore, by limiting the displacement between the panels, reinstallation of the panel subsequent to the deployment of the airbag becomes much easier. The need persists in the art for a reliable and durable panel fastener or clip that will continue to tether two panels together while allowing for a controlled displacement between the two panels in response to a predetermined force.

SUMMARY OF THE INVENTION

The present invention is directed to reliable and durable panel fasteners or tether clips that continue to tether two panels together while allowing for a controlled displacement between the two panels in response to a predetermined force. The panel fasteners or tether clips according to the present invention include a first retaining means near a first end that is adapted to be securable to a first panel, a second retaining means that is engageable with the second panel and limits the relative separation between the panels, and a releasable fastener means intermediate the first and second retaining means that normally maintains the two panels in a closed configuration relative to one another but that releases at least one of the panels relative to the other panel in response to a predetermined force tending to separate the panels. The type of panel fasteners that, while securing two panels together under normal circumstances, will also allow for a controlled displacement between the two panels in response to the application of a predetermined force, are referred to herein as tether clips.

BRIEF DESCRIPTION OF THE DRAWINGS

FIGS. 4–8 are views of a second embodiment of a tether clip system according to the present invention.

FIGS. 14–27 are views of a fourth embodiment of a tether clip system according to the present invention.

FIGS. 30–45 are views of a sixth embodiment of a tether clip system according to the present invention.

FIGS. 46–57 are views of a seventh embodiment of a tether clip system according to the present invention.

FIGS. 58–64 are views of an eighth embodiment of a tether clip system according to the present invention.

Like reference numerals indicate like elements throughout the several views.

DETAILED DESCRIPTION OF THE INVENTION

Figure 1:
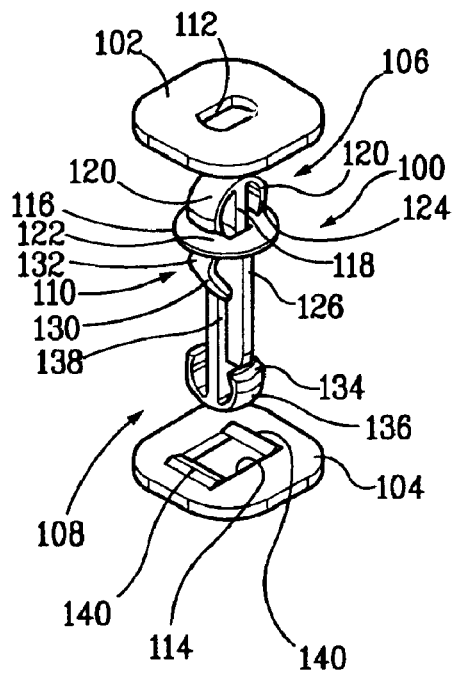
FIGS. 1–3 are views of a first embodiment of a tether clip system according to the present invention.
Figure 2:
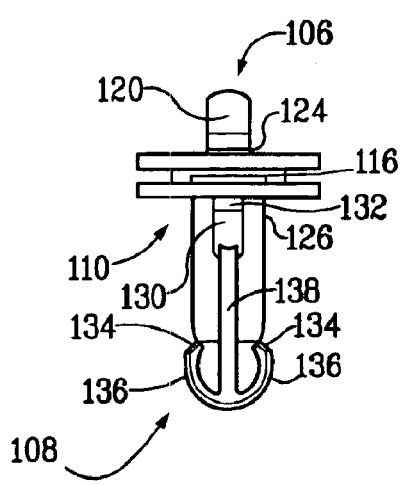
Figure 3:
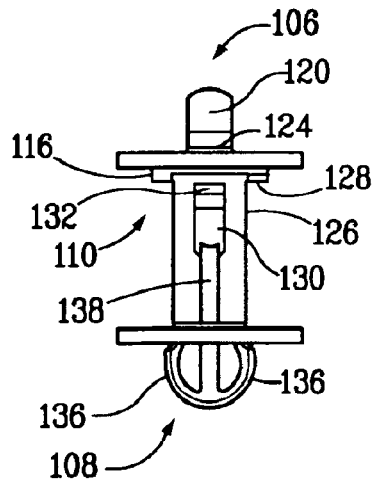
Figure 4:
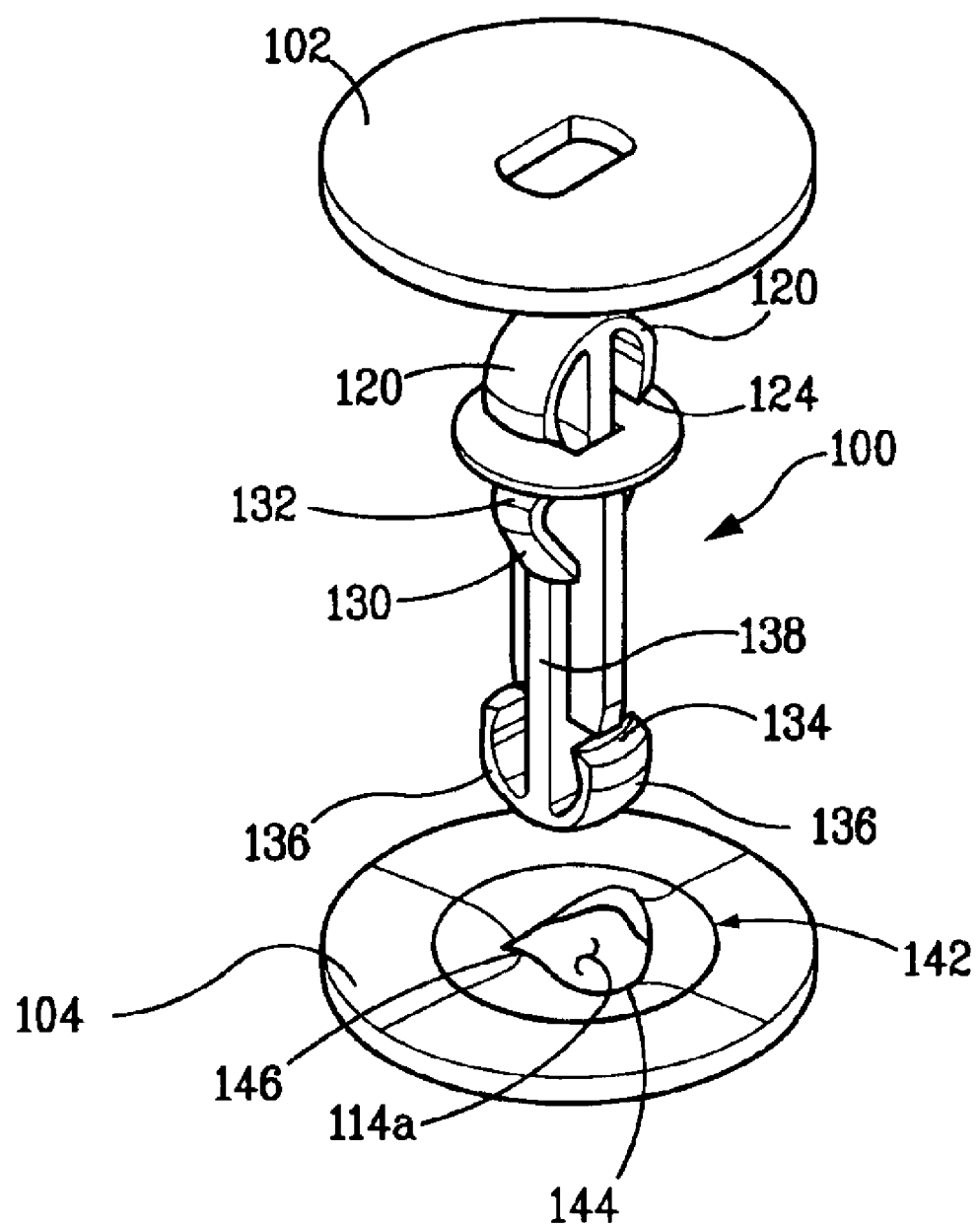
Figure 9:
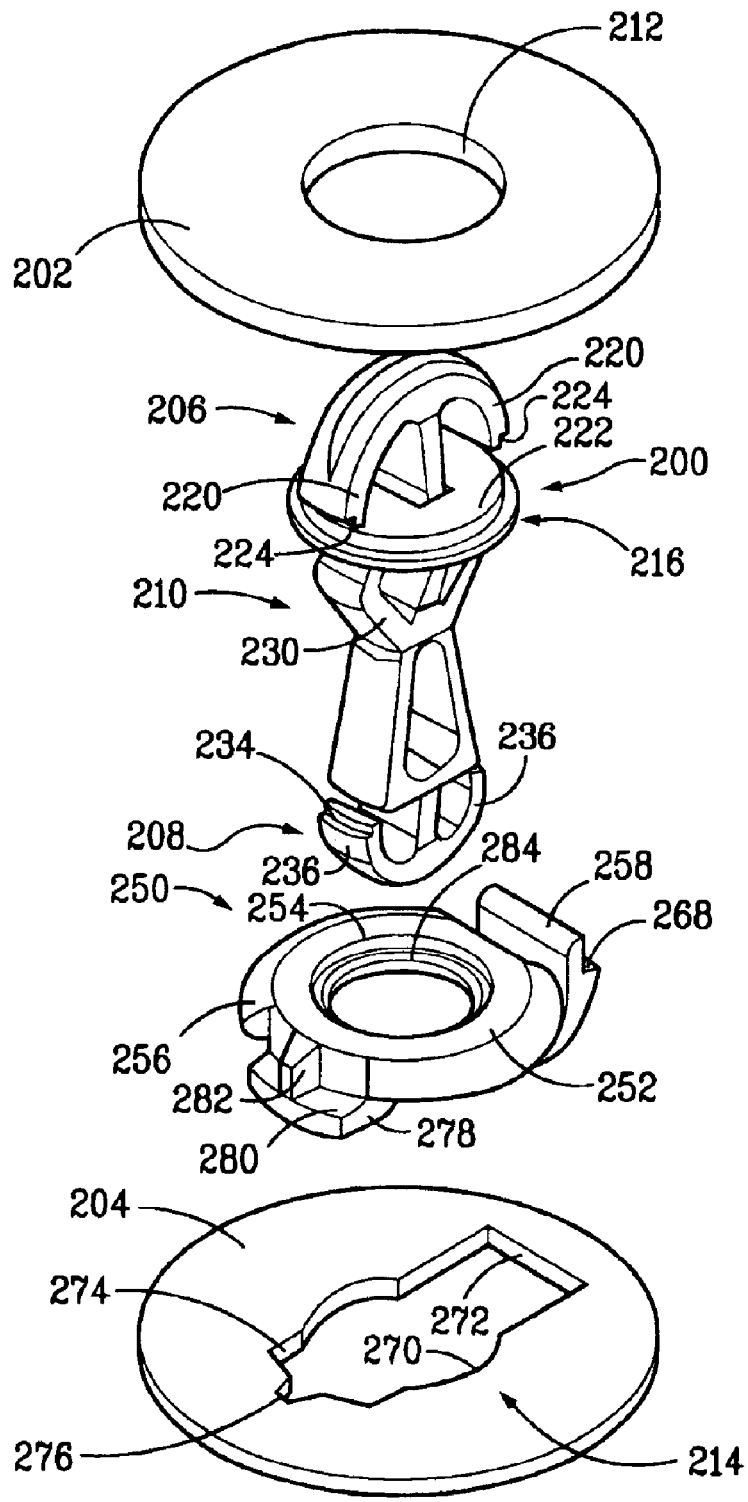
FIGS. 9–13 are views of a third embodiment of a tether clip system according to the present invention.

Referring to FIGS. 1–3, an illustrative example of a tether clip system according to the present invention can be seen. The tether clip system of FIGS. 1–3 includes a tether clip 100 for fastening a first panel 102 relative to a second panel 104. The tether clip 100 comprises a first retaining means 106 adapted to be securable to the first panel 102; a second retaining means 108 that is engageable with the second panel 104 and limits the relative separation between the first and second panels; and a releasable fastener means 110 intermediate the first and second retaining means 106 and 108. The releasable fastener means 110 is adapted to be releasably engageable with the second panel 104. The releasable fastener means 110 is adapted to normally maintain the first and second panels in a closed configuration relative to one another as shown in FIG. 2. The releasable fastener means 110 is designed to release the second panel 104 in response to a force tending to separate the first and second panels that is greater than a first predetermined value, thus allowing the panel 104 to move to the position shown in FIG. 3.

The first panel 102 has a first opening 112 and the second panel 104 has a second opening 114. The first retaining means 106 comprises a shoulder 116; a first body portion 118 projecting from a first side of the shoulder 116 and having an end distal from the shoulder 116. The first body portion 118 has a first longitudinal axis that is coincident with the longitudinal axis of the tether clip 100. The first retaining means 106 further includes a first pair of resilient snap legs 120 attached to the first body portion 118 proximate the end of the first body portion distal from the shoulder 116. Each of the first pair of resilient snap legs 120 has a proximal end and a distal end. Each of the first pair of resilient snap legs 120 is attached to the first body portion 118 proximate the proximal end of each of the first pair of resilient snap legs. Each of the first pair of resilient snap legs 120 extends from the proximal end thereof generally in a direction toward a plane coincident with the first side 122 of the shoulder 116 and at least in part diverging away from the longitudinal axis of the tether clip 100.

Each of the first pair of resilient snap legs 120 has at least one notch 124 provided proximate the distal end of each of the first pair of resilient snap legs 120. When the first retaining means 106 is secured to the first panel 102, at least a portion of the first panel 102 proximate the first opening 112 is captured between at least a portion of the shoulder 116 and the notch 124 in each of the first pair of resilient snap legs 120 to thereby secure the tether clip 100 to the first panel 102.

The releasable fastener means 110 comprises a second body portion 126 projecting from a second side 128 of the shoulder 116 and has an end distal from the shoulder 116. The second body portion 126 has a second longitudinal axis in line with the first longitudinal axis and thus coincident with the longitudinal axis of the tether clip 100. The releasable fastener means 110 further comprises a second pair of resilient snap legs 130 attached to the second body portion 126 proximate the end of the second body portion distal from the shoulder 116.

Each of the second pair of resilient snap legs 130 has a proximal end and a distal end. Each of the second pair of resilient snap legs 130 is attached to the second body portion 126 proximate the proximal end of each of the second pair of resilient snap legs 130, and a portion of each of the second pair of resilient snap legs 130 extends from proximate the proximal end of each of the second pair of resilient snap legs generally in a direction toward a plane coincident with the second side 128 of the shoulder and that diverges away from the longitudinal axis of the tether clip 100.

Each of the second pair of resilient snap legs 130 has a surface portion 132 proximate the distal end thereof that converges toward the longitudinal axis of the tether clip with decreasing distance from the second side 128 of the shoulder 116. When the releasable fastener means 110 is secured to the second panel 104 (as shown in FIGS. 2, 7, and 8) at least a portion of the second panel 104 proximate the second opening 114 is captured between at least a portion of the shoulder 116 and the surface portion 132 proximate the distal end of each of the second pair of resilient snap legs 130 to thereby secure the second panel 104 to the first panel 102 in the closed configuration of FIGS. 2, 7, and 8. The surface portion 132 proximate the distal end of each of the second pair of resilient snap legs 130 cooperates with the portion of the second panel 104 proximate the second opening 114 to bend the second pair of resilient snap legs 130 toward the longitudinal axis of the tether clip to thereby allow the second panel 104 to be released from the releasable fastener means 110 to the positions shown in FIGS. 3, 5 and 6 when the releasable fastener means is initially secured to the second panel 104 and a force tending to move the first and second panels apart and of a magnitude greater than the first predetermined value is applied.

The second retaining means 108 comprises a third body portion 138 attached to the releasable fastener means 110 proximate the proximal end of each of the second pair of resilient snap legs 130. The third body portion 138 has an end distal from the releasable fastener means 110. The third body portion 138 has a third longitudinal axis in line with the second longitudinal axis and the longitudinal axis of the tether clip 100. The third body portion 138 has a third pair of resilient snap legs 136 attached to the third body portion 138 proximate the end of the third body portion distal from the releasable fastener means 110.

Each of the third pair of resilient snap legs 136 has a proximal end and a distal end. Each of the third pair of resilient snap legs 136 is attached to the third body portion 138 proximate the proximal end of each of the third pair of resilient snap legs 136. Each of the third pair of resilient snap legs 136 extends from the proximal end thereof generally in a direction toward a plane coinciding with the second side 128 of the shoulder 116 and at least in part diverges away from the longitudinal axis of the tether clip.

Each of the third pair of resilient snap legs 136 has at least one notch 134 provided proximate the distal end of each of the third pair of resilient snap legs 136. The notch 134 in each of the third pair of resilient snap legs 136 can engage at least a portion of the second panel 104 proximate the second opening 114 to limit the separation between the first and second panels 102 and 104 when the second panel 104 is released by the releasable fastener means 110 (as shown in FIGS. 3, 5, and 6) after being initially secured to the first panel 102 by the releasable fastener means 110. The snap legs 136 will maintain the panel 104 in the position shown in FIGS. 3, 5, and 6 as long as any applied force tending to move the first and second panels 102 and 104 further apart is of a magnitude less than a second predetermined value.

In the tether clip 100, wherein a medial plane passing through both the second pair of resilient snap legs 130 is substantially at a right angle measured about the longitudinal axis of the tether clip 100 relative to a medial plane passing through both the third pair of resilient snap legs 136.

The tether clip system of FIGS. 1–3 also includes up turned portions 140. The first pair of regions 140 of the portion of the second panel 104 adjacent the second opening 144 are located on opposite sides of the second opening 114 along a first axis. Each of the first pair of regions 140 at least in part project outward from a first side of the second panel 104 facing the first panel 102 to form a pair of ramped surfaces inclined relative to a medial plane of the portion of the second panel 104 having the second opening 114 therein. The regions 140 present a smooth surface for engagement with the snap legs 130 when the second pair of resilient snap legs 130 engage with the portions of the second panel 104 proximate the second opening 114 to bend the second pair of resilient snap legs 130 toward the longitudinal axis of the tether clip to thereby allow the second panel 104 to be released from the releasable fastener means 110. This feature provides better control of the force required to release the panel 104 from the releasable fastener means 110 and helps prevent snags.

The tether clip system of FIGS. 4–8 is identical to that of FIGS. 1–3 except for the differences noted below. The tether clip system of FIGS. 4–8 has a means 142 for increasing retention strength between the second retaining means 108 and the second panel 104 when the second panel has been released from the releasable fastener means 110.

In the tether clip system of FIGS. 4–8, the means 142 for increasing retention strength comprises a portion of the second panel 104 having a second opening 114a therein. The portion of the second panel 104 surrounding the second opening 114a has a first pair of regions 146 that are located on opposite sides of the second opening 114a along a first axis. Each of the first pair of regions 146 at least in part project outward from a first side of the second panel 104 facing the first panel 102 to form a pair of ramped surfaces inclined relative to a medial plane of the portion of the second panel 104 having the second opening 114a therein. A second pair of regions 144 of the portion of the second panel 104 adjacent the second opening 114a are also located on opposite sides of the second opening 114a, but along a second axis that is perpendicular to the first axis between the regions 146 in plan view. Each of the second pair of regions 144 at least in part project outward from a second side of the second panel opposite the first side of the second panel 104 and provide a catch that more positively engages the snap legs 136 as shown in FIGS. 5 and 6. The means 142 for increasing retention strength comprises the regions 144.

As an example of the use of the tether clip 100, Panel 102 may be the interior panel of the door of a motor vehicle and the panel 104 may be the sheet metal of the door. The retaining means 106 is attached to the panel 102 by pressing in the portion 118 into the hole 112. The sides of the hole 112 deform the snap legs 120. Once the notches 124 clear the panel 102, the snap legs 120 snap open behind the panel 102 to secure the tether clip 100 to the panel 102. Once the airbag is in place the second retaining means 108 is pushed through the hole 114 or 114a. As with snap legs 120, snap legs 136 deform by the action of the sides of the hole 114 or 114a to allow the snap legs 136 to pass through the hole 114 or 114a and open up behind the panel 104 to prevent the tether clip 100 from being pulled completely out of the hole 114 or 114a unless a force exceeding the second predetermined force is applied to the panels. The panel 104 can now move freely between the retaining means 108 and the releasable fastener means 110. To secure the panel 102 in its normal position, the releasable fastener means 110 is snapped into the hole 114 or 114a. The snap legs 130 deform by the action of the sides of the hole 114 or 114a to allow the snap legs 130 to pass through the hole 114 or 114a and open up behind the panel 104 to secure the panel 102 in the normal position of FIGS. 2, 7, and 8.

When the airbag inflates, a force in excess of the first predetermined value and tending to pull the panels apart is created. The ramped surfaces 132 catch the edges of the hole 114 or 114a in a cam action that bends the snap legs 130 toward the longitudinal axis of the tether clip 100. This allows the insertion process of the releasable fastener means 110 to be reversed and for the releasable fastener means 110 to release the panel 104. As the airbag inflates further, the snap legs 136 catch the panel 104 and prevent the panel 102 from being pulled completely free from the vehicle door panel 104. Thus, an opening between panels 102 and 104 can be provided for the proper inflation of the airbag without allowing the panel 102 to become a projectile. The snap legs 136 are designed such that they fail at forces greater than a second predetermined value that is higher than the forces encountered during airbag deployment. The second predetermined value is usually greater that the first predetermined value. The first predetermined value can range from 10 to 50 lbs., and preferably from about 20 to about 30 lbs., and even more preferably from 20 to 30 lbs. The second predetermined value can be in the range of 75 lbs. and greater, and preferably is in the range of about 150 lbs. and greater, and even more preferably about 150 lbs. The travel between the panels 102 and 104 during airbag deployment is about 25 mm.

Figure 10:
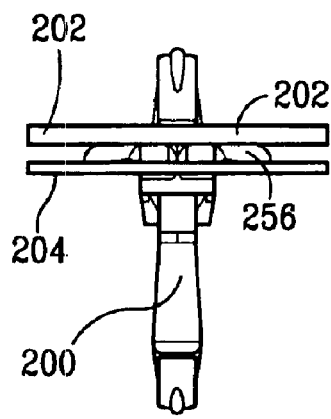
Figure 11:
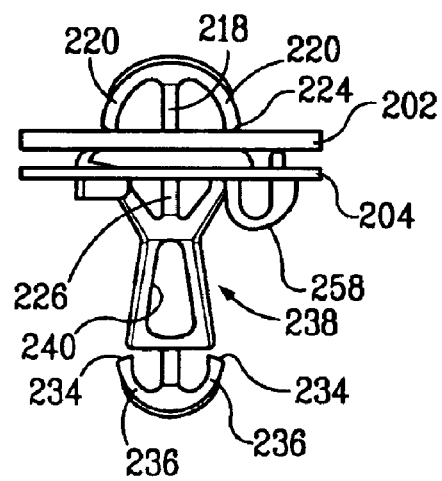

Referring to FIGS. 9–13, a third illustrative embodiment of a tether clip system according to the present invention can be seen. The tether clip system of FIGS. 9–13 includes a tether clip 200, for fastening a first panel 202 relative to a second panel 204, and a receptacle 250. The tether clip 200 comprises a first retaining means 206 adapted to be securable to the first panel 202; a second retaining means 208 that is engageable with the second panel 204 and limits the relative separation between the first and second panels; and a releasable fastener means 210 intermediate the first and second retaining means 206 and 208. The releasable fastener means 210 is adapted to be releasably engageable with the second panel 204. The releasable fastener means 210 is adapted to normally maintain the first and second panels in a closed configuration relative to one another as shown in FIGS. 10 and 11. The releasable fastener means 210 is designed to release the second panel 204 in response to a force tending to separate the first and second panels that is greater than a first predetermined value, thus allowing the panel 204 to move to the position shown in FIGS. 12 and 13.

The first panel 202 has a first opening 212 and the second panel 204 has a second opening 214. The opening 214 is adapted to receive the receptacle 250. The receptacle 250 has a portion 252 defining a receptacle opening 254 that is aligned with the second opening 214 when the receptacle 250 is mounted to the second panel 204. The receptacle 250 further comprises at least one flange-like portion 256 adapted to engage a first side of the second panel 204 facing the first panel 202 when the receptacle 250 is mounted to the second panel 204. The receptacle 250 further comprises a U-shaped leaf spring member 258 having a first terminus 260 and a second terminus 262. The U-shaped leaf spring member 258 is made of a resilient material. The U-shaped leaf spring member 258 has a first arm portion 264 adjacent the first terminus 260 and a second arm portion 266 adjacent the second terminus 262. The U-shaped leaf spring member 258 is attached proximate the first terminus 260 to the portion 252 defining the receptacle opening 254. The U-shaped leaf spring member 258 has a projection 268 on the second arm member 266. The projection 268 has an inclined ramp surface on one side and a catch surface on the other side. The catch surface of the projection 268 is engageable to a second side of the second panel 204 opposite the first side of the second panel, when the receptacle is mounted to the second panel 204, to thereby secure the receptacle 250 to the second panel 204. The second side of the panel 204 is the side that faces away from the panel 202 when the two panels are fastened together by the tether clip 200.

The opening 214 in panel 204 is in the form of a circular opening portion 270 that has a first slot 272 extending from one side and a second, shorter slot 274 extending from the other side. The slot 274 may optionally have a guide notch 276. The slot 274 provides clearance for the attachment portion of the tab 278 that is attached to the receptacle portion 252. The tab 278 has a catch surface 280 that contacts the second side of the panel 204 to more strongly retain the receptacle 250 on the panel 204. The receptacle 250 has an optional guide fin 282 that fits into the guide notch 276. The guide notch 276 and guide fin 282 cooperatively help to align the U-shaped leaf spring member 258 with the slot 272.

To install the receptacle 250 to the panel 204, the receptacle 250 is canted and the tab 278 is positioned in the slot 274 such that the catch surface 280 is positioned under the second side of the panel 204 with the guide fin 282 positioned in the guide notch 276. In this position, the U-shaped leaf spring member 258 is aligned with and positioned at least in part in the slot 272. The side of the receptacle portion 252 to which the U-shaped leaf spring member 258 is attached is then pushed in toward the panel 204. As the inclined ramp surface of the projection 268 comes into contact with the squared-off end of the slot 272, the arms 264 and 266 of the U-shaped leaf spring member 258 are brought together such that the projection 268 clears the squared-off end of the slot 272. The side of the receptacle portion 252 to which the U-shaped leaf spring member 258 is attached is then pushed in further until the underside of the flange portions 256 contact the first surface of the panel 204. The arm portion 266 of the U-shaped leaf spring member 258 then snaps back toward its original position relative to the arm portion 264 of the U-shaped leaf spring member 258 such that the catch surface of the projection 268 snaps under the second side of the second panel 204 to thereby secure the receptacle 250 to the second panel 204. When the receptacle 250 is secured to the panel 204, portions of the panel 204 around the opening 214 are captured between flange-like portions 256 on one side and the catch surface of the projection 268 and the catch surface 280 of the tab 278 on the other side to secure the receptacle 250 to the panel 204.

An annular shoulder is provided in the bore of the opening 254. In the example of FIGS. 9–13, this annular shoulder is provided by an annular, internal flange 284 provided in the bore of the opening 254. The function of the shoulder in the bore of the opening 254 is explained below.

The first retaining means 206 comprises a shoulder 216; a first body portion 218 projecting from a first side of the shoulder 216 and having an end distal from the shoulder 216. The first body portion 218 has a first longitudinal axis that is coincident with the longitudinal axis of the tether clip 200. The first retaining means 206 further includes a first pair of resilient snap legs 220 attached to the first body portion 218 proximate the end of the first body portion distal from the shoulder 216.

Each of the first pair of resilient snap legs 220 has a proximal end and a distal end. Each of the first pair of resilient snap legs 220 is attached to the first body portion 218 proximate the proximal end of each of the first pair of resilient snap legs. Each of the first pair of resilient snap legs 220 extends from the proximal end thereof generally in a direction toward a plane coincident with the first side 222 of the shoulder 216 and at least in part diverging away from the longitudinal axis of the tether clip 200.

Each of the first pair of resilient snap legs 220 has at least one notch 224 provided proximate the distal end of each of the first pair of resilient snap legs 220. When the first retaining means 206 is secured to the first panel 202, at least a portion of the first panel 202 proximate the first opening 212 is captured between at least a portion of the shoulder 216 and the notch 224 in each of the first pair of resilient snap legs 220 to thereby secure the tether clip 200 to the first panel 202.

The releasable fastener means 210 comprises a second body portion 226 projecting from a second side 228 of the shoulder 216 and has an end distal from the shoulder 216. The second body portion 226 has a second longitudinal axis in line with the first longitudinal axis and thus coincident with the longitudinal axis of the tether clip 200. The releasable fastener means 210 further comprises a second pair of resilient snap legs 230 attached to the second body portion 226 proximate the end of the second body portion distal from the shoulder 216.

Each of the second pair of resilient snap legs 230 has a proximal end and a distal end. Each of the second pair of resilient snap legs 230 is attached to the second body portion 226 proximate the proximal end of each of the second pair of resilient snap legs 230, and a portion of each of the second pair of resilient snap legs 230 extends from proximate the proximal end of each of the second pair of resilient snap legs generally in a direction toward a plane coincident with the second side 228 of the shoulder and that diverges away from the longitudinal axis of the tether clip 200.

Each of the second pair of resilient snap legs 230 has a surface portion 232 proximate the distal end thereof that converges toward the longitudinal axis of the tether clip with decreasing distance from the second side 228 of the shoulder 216. When the releasable fastener means 210 is secured to the second panel 204 via the receptacle 250 (as shown in FIGS. 10 and 11) at least a portion of the receptacle 250 proximate the receptacle opening 254 is captured between at least a portion of the shoulder 216 and the surface portion 232 proximate the distal end of each of the second pair of resilient snap legs 230 to thereby secure the second panel 204 to the first panel 202 in the closed configuration of FIGS. 10 and 11. The surface portion 232 proximate the distal end of each of the second pair of resilient snap legs 230 cooperates with the portion of the receptacle 250 proximate the receptacle opening 254 to bend the second pair of resilient snap legs 230 toward the longitudinal axis of the tether clip to thereby allow the second panel 204 to be released from the releasable fastener means 210 to the positions shown in FIGS. 12 and 13 when the releasable fastener means is initially secured to the receptacle 250 installed in the second panel 204 and a force is applied that tends to move the first and second panels apart and that is of a magnitude greater than the first predetermined value.

The second retaining means 208 comprises a third body portion 238 attached to the releasable fastener means 210 proximate the proximal end of each of the second pair of resilient snap legs 230. The third body portion 238 has an end distal from the releasable fastener means 210. The third body portion 238 has a third longitudinal axis in line with the second longitudinal axis and the longitudinal axis of the tether clip 200. The third body portion 238 has a third pair of resilient snap legs 236 attached to the third body portion 238 proximate the end of the third body portion distal from the releasable fastener means 210.

Each of the third pair of resilient snap legs 236 has a proximal end and a distal end. Each of the third pair of resilient snap legs 236 is attached to the third body portion 238 proximate the proximal end of each of the third pair of resilient snap legs 236. Each of the third pair of resilient snap legs 236 extends from the proximal end thereof generally in a direction toward a plane coinciding with the second side 228 of the shoulder 216 and at least in part diverges away from the longitudinal axis of the tether clip.

Figure 12:
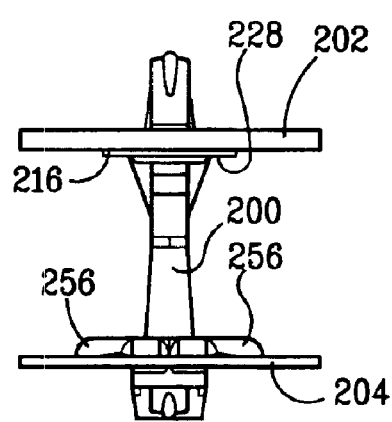
Figure 13:
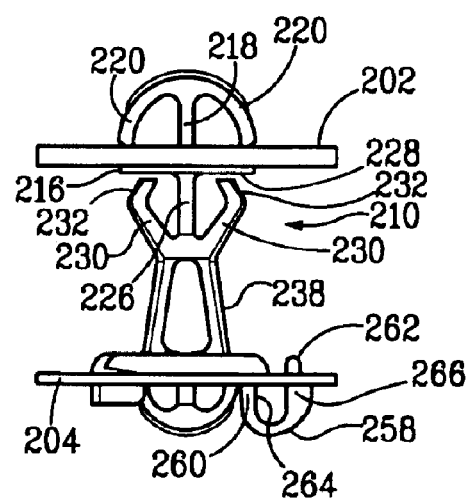
Figure 14:
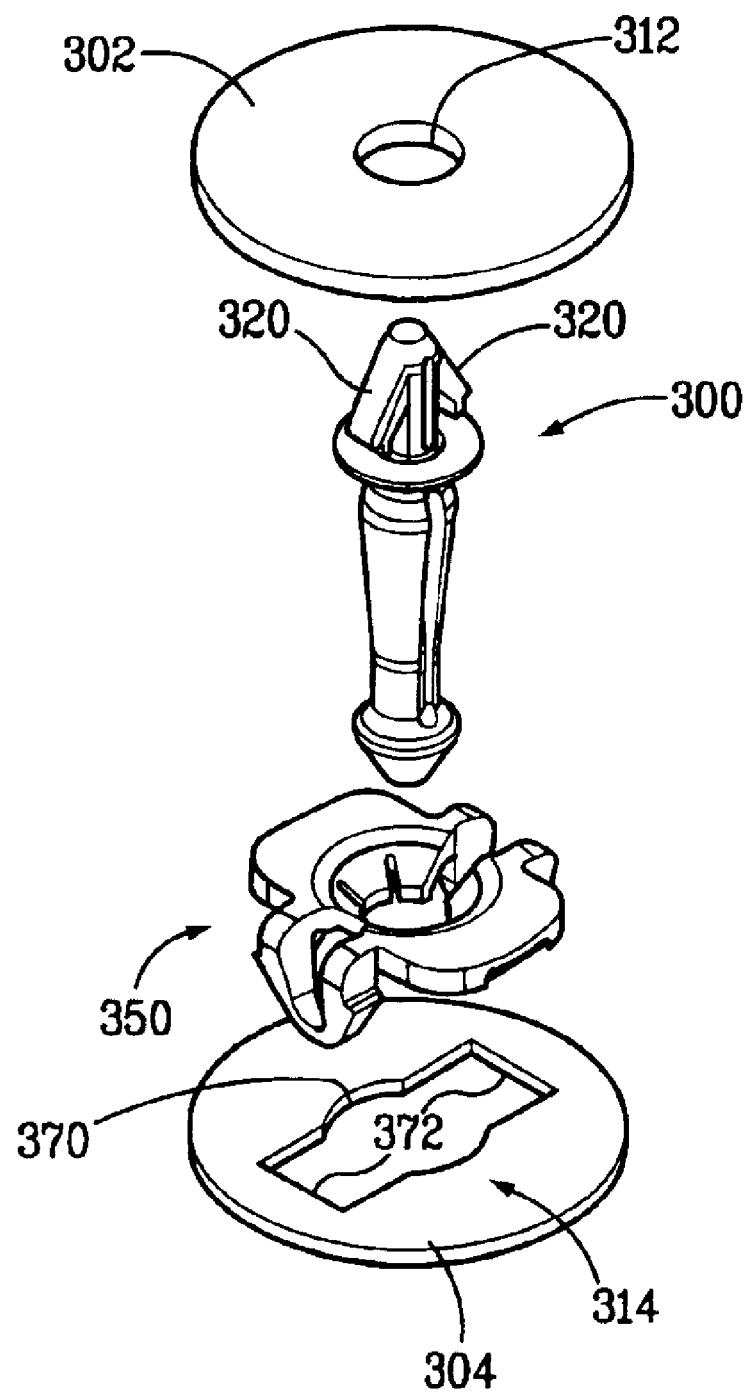

Each of the third pair of resilient snap legs 236 has at least one notch 234 provided proximate the distal end of each of the third pair of resilient snap legs 236. The notch 234 in each of the third pair of resilient snap legs 236 can engage at least a portion of the shoulder defined by the flange 284 in the bore of the receptacle opening 254 to limit the separation between the first and second panels 202 and 204 when the second panel 204 is released by the releasable fastener means 210 (as shown in FIGS. 12 and 13) after being initially secured to the first panel 202 by the releasable fastener means 210. The snap legs 236 will maintain the panel 204 in the position shown in FIGS. 12 and 13 as long as any applied force tending to move the first and second panels 202 and 204 further apart is of a magnitude less than a second predetermined value.

In the tether clip 200, a medial plane passing through both the second pair of resilient snap legs 230 is substantially coplanar with a medial plane passing through both the third pair of resilient snap legs 236. The body portion 238 has a relatively large width at a position along its length corresponding approximately to the distal ends of the resilient snap legs 236. This relatively large width is slightly smaller than the interior diameter of the annular flange 284 and ensures that the resilient snap legs 236 are properly positioned relative to the receptacle opening 254 just before the distal ends of the resilient snap legs 236 contact the shoulder in the bore of the receptacle opening 254. The body portion 238 has a narrower width proximate the proximal end of each of the second pair of resilient snap legs 230 as compared to the portion having the relatively large width located at the position along the length of the body portion 238 corresponding approximately to the distal ends of the resilient snap legs 236. The portion of the body portion 238 extending from proximate the proximal end of each of the second pair of resilient snap legs 230 to the position corresponding approximately to the distal ends of the resilient snap legs 236, is cored out to save on material costs and weight thus forming the opening 240.

The tether clip 200 may be directly fastened to the second panel 204 in the same manner as the tether clip of FIGS. 1–3. However, using the receptacle 250 has several advantages. First, the cost and difficulty of providing the complex geometry of the holes such as those in the panels 104 of FIGS. 1–8 is avoided. By having better control over the geometry and materials of the structures that come in contact the releasable fastener means and the second retaining means, the required release force specifications can be more accurately met. The material of the receptacle 250 can be selected for better compatibility with the releasable fastener means and the second retaining means to reduce wear and damage to these parts. Particularly if the panels 104 and 204 are of sheet metal, using the receptacle 250 can prevent contact between the tether clip and sharp edges in the sheet metal that could cause the tether clip to fail.

As an example of the use of the tether clip 200, panel 202 may be the interior panel of the door of a motor vehicle and the panel 204 may be the sheet metal of the door. The retaining means 206 is attached to the panel 202 by pressing in the portion 218 into the hole 212. The sides of the hole 212 deform the snap legs 220. Once the notches 224 clear the panel 202, the snap legs 220 snap open behind the panel 202 to secure the tether clip 200 to the panel 202. The receptacle 250 is installed in the hole 214 of panel 204 as previously described. Once the airbag is in place the second retaining means 208 is pushed through the hole 254 of the receptacle 250. As with snap legs 220, snap legs 236 deform by the action of the sides of the hole 254 to allow the snap legs 236 to pass through the hole 254 and open up behind the shoulder in the bore of the hole 254 to prevent the tether clip 200 from being pulled completely out of the receptacle 250 unless a force exceeding the second predetermined force is applied to the panels. The panel 204 can now move freely between the retaining means 208 and the releasable fastener means 210. To secure the panel 202 in its normal position, the releasable fastener means 210 is snapped into the hole 254. The snap legs 230 deform by the action of the sides of the hole 254 to allow the snap legs 230 to pass through the hole 254 and open up behind the opening 254 to secure the panel 202 in the normal position of FIGS. 10 and 11.

When the airbag inflates, a force in excess of the first predetermined value and tending to pull the panels apart is created. The ramped surfaces 232 catch the edges of the hole 254 in a cam action that bends the snap legs 230 toward the longitudinal axis of the tether clip 200. This allows the insertion process of the releasable fastener means 210 to be reversed and for the releasable fastener means 210 to release the panel 204. As the airbag inflates further, the snap legs 236 catch the receptacle 250 and consequently the panel 204 and prevent the panel 202 from being pulled completely free from the vehicle door panel 204. Thus, an opening between panels 202 and 204 can be provided for the proper inflation of the airbag without allowing the panel 202 to become a projectile. The snap legs 236 are designed such that they fail at forces greater than a second predetermined value that is higher than the forces encountered during airbag deployment. The second predetermined value is usually greater that the first predetermined value. The first predetermined value can range from 10 to 50 lbs., and preferably from about 20 to about 30 lbs., and even more preferably from 20 to 30 lbs. The second predetermined value can be in the range of 75 lbs. and greater, and preferably is in the range of about 150 lbs. and greater, and even more preferably is about 150 lbs. The travel between the panels 202 and 204 during airbag deployment is about 25 mm.

Referring to FIGS. 14–27, a fourth illustrative embodiment of a tether clip system according to the present invention can be seen. The tether clip system of FIGS. 14-27 is used for fastening a first panel 302 having a first opening 312 in a closed configuration relative to a second panel 304 having a second opening 314. The tether clip system of FIGS. 14–27 includes a tether clip 300 and a receptacle 350. The receptacle 350 is adapted for mounting to the second opening 314 in the second panel 304.

The tether clip 300 includes first retaining means 306 adapted to be securable to the first panel 302 and second retaining means 308. The second retaining means 308 engages with the receptacle 350 in order to limit the relative separation between the first and second panels 302 and 304, when the receptacle 350 is mounted to the second panel 404, the tether clip 300 is mounted to the first panel 302, and the first and second panels 302 and 304 are in an open configuration relative to one another (see FIGS. 17 and 18).

Figure 15:
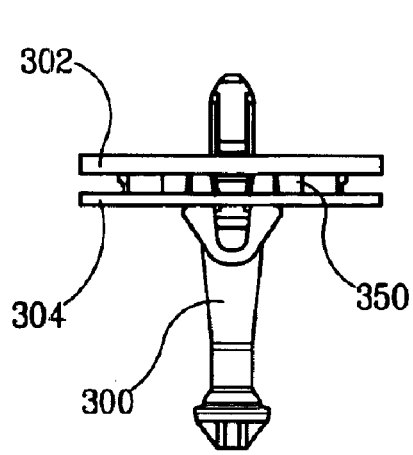
Figure 16:
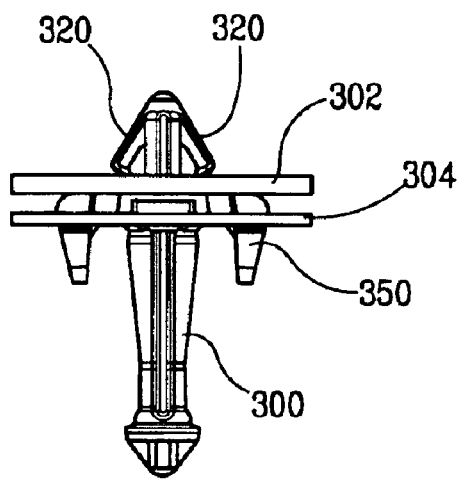
Figure 17:
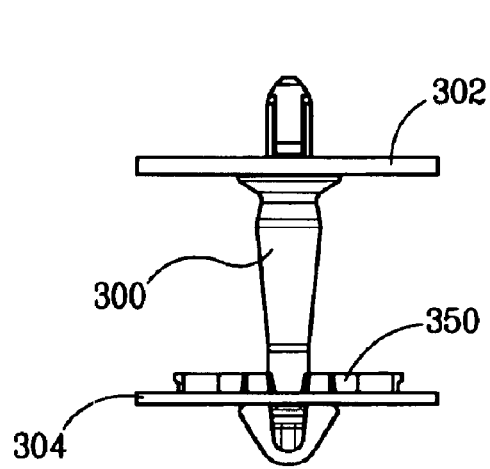
Figure 18:
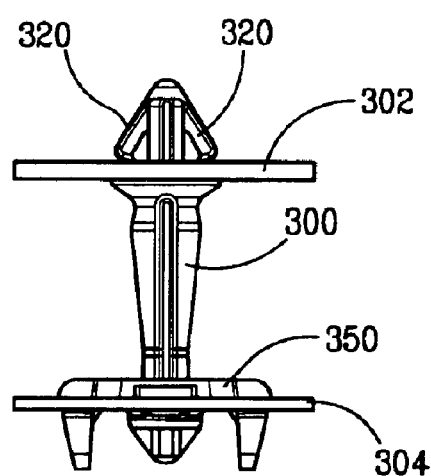
Figure 19:
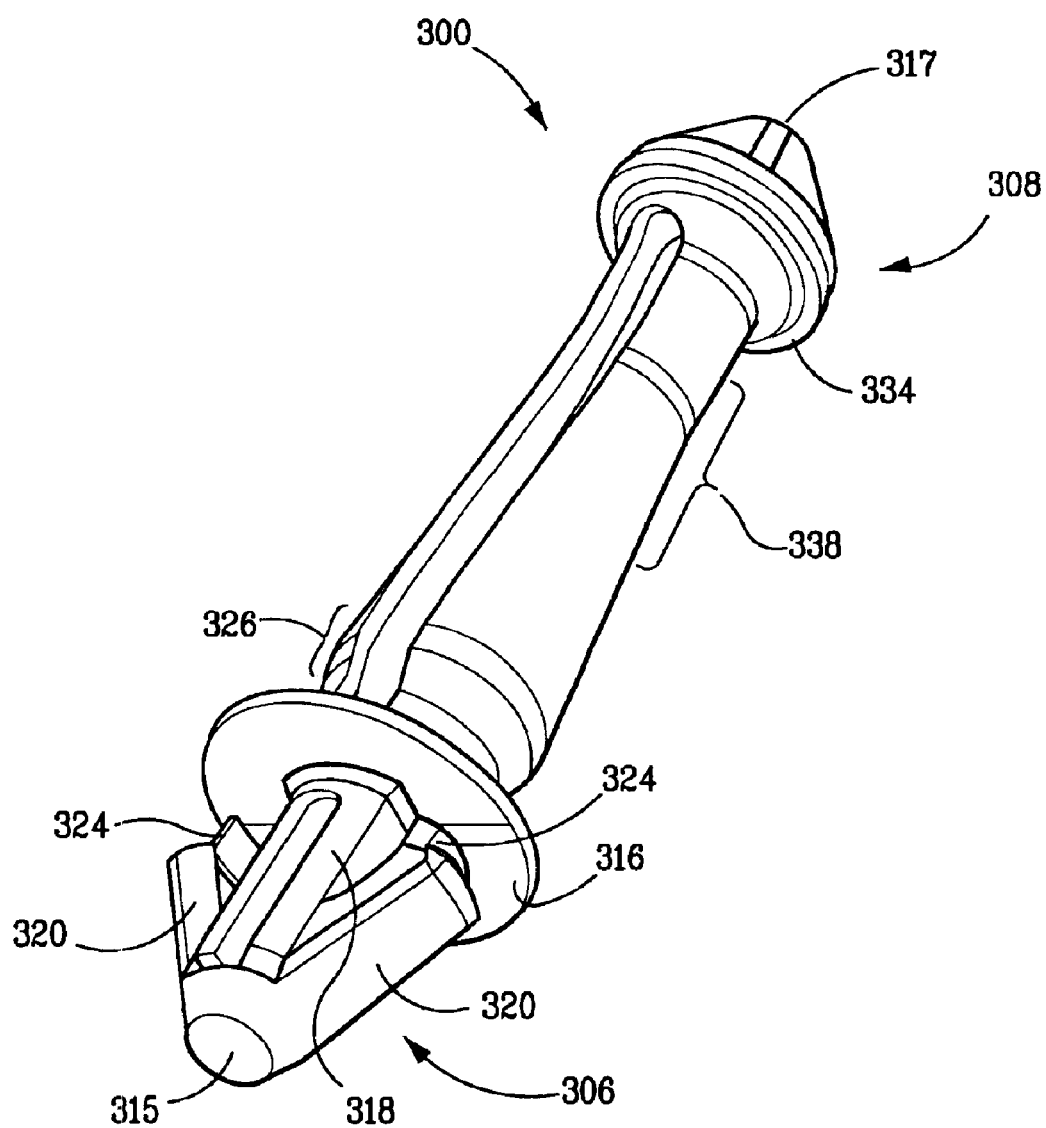
Figure 22:
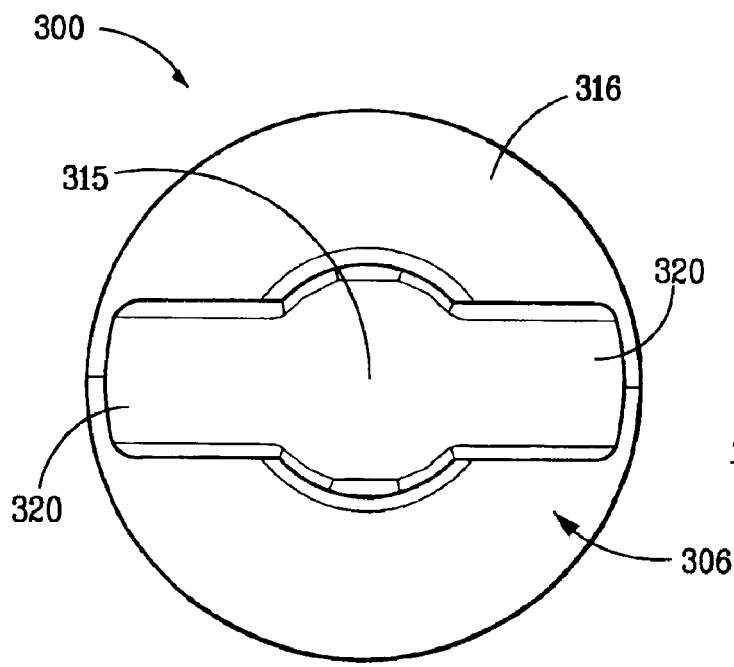
Figure 23:
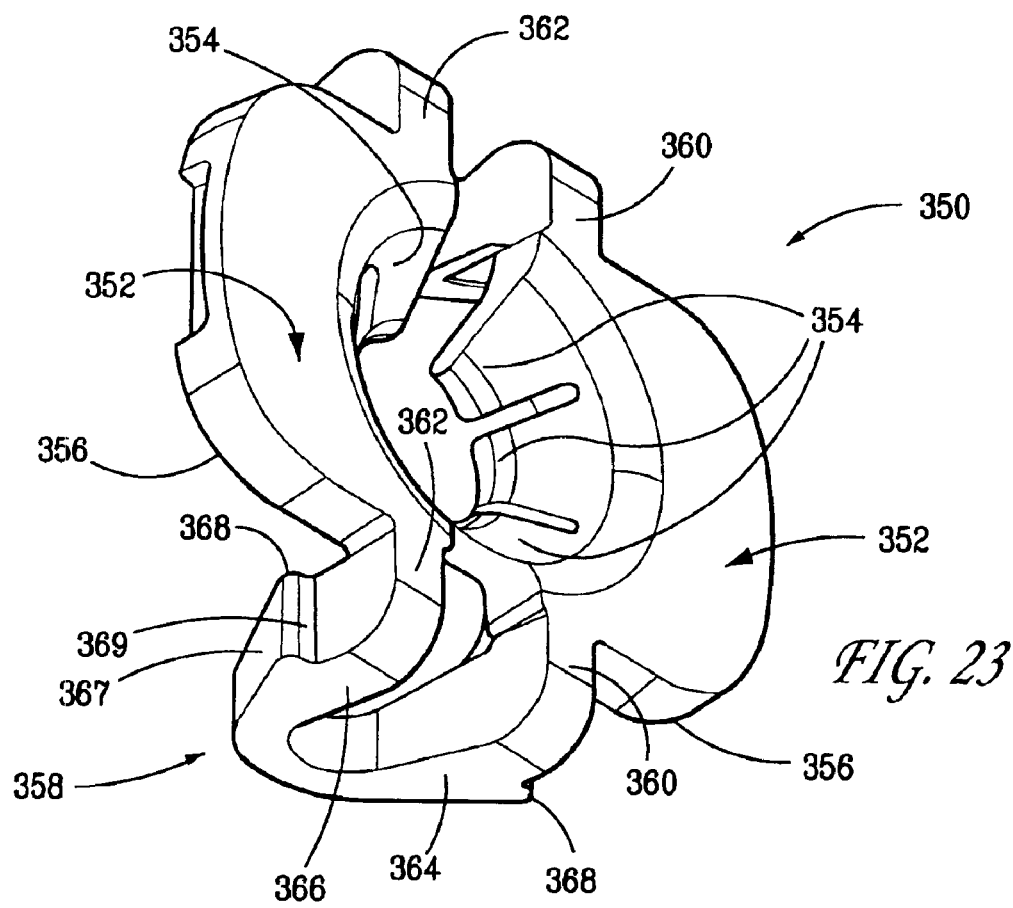
Figure 24:
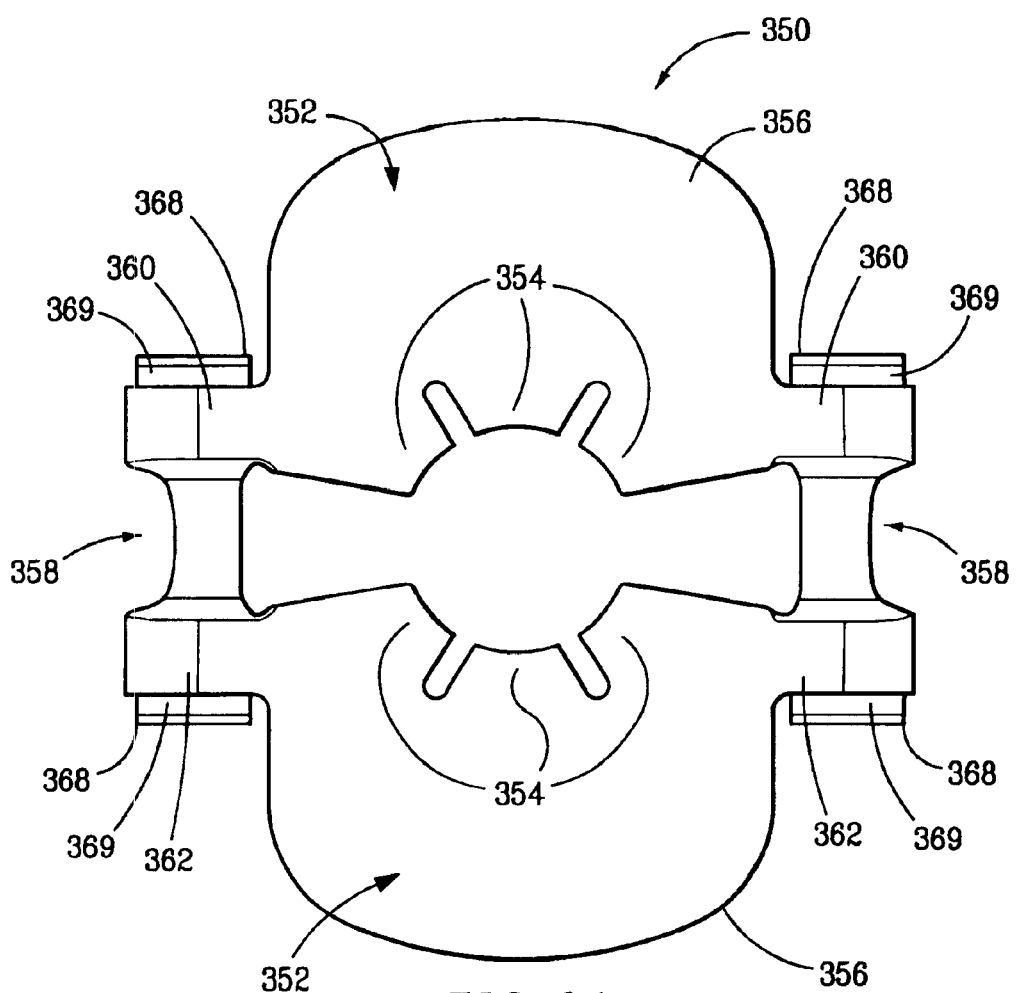
Figure 25:
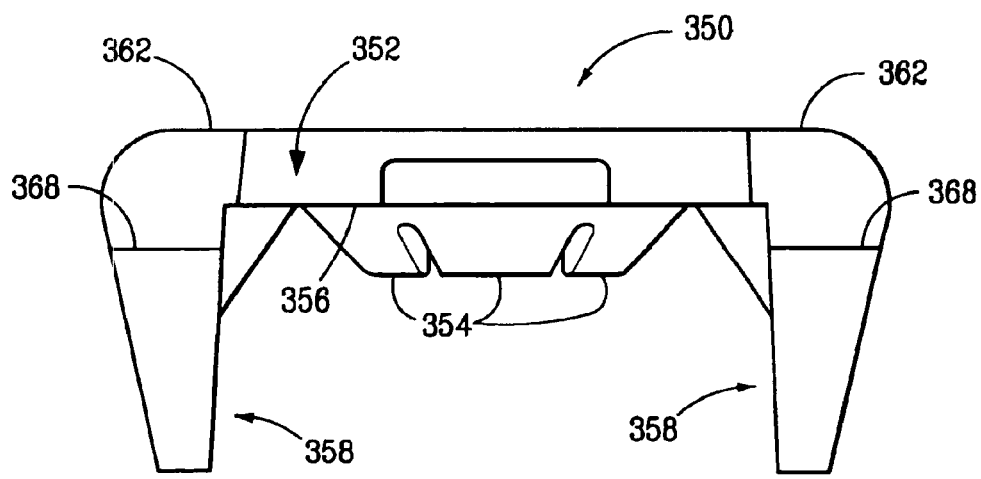
Figure 26:
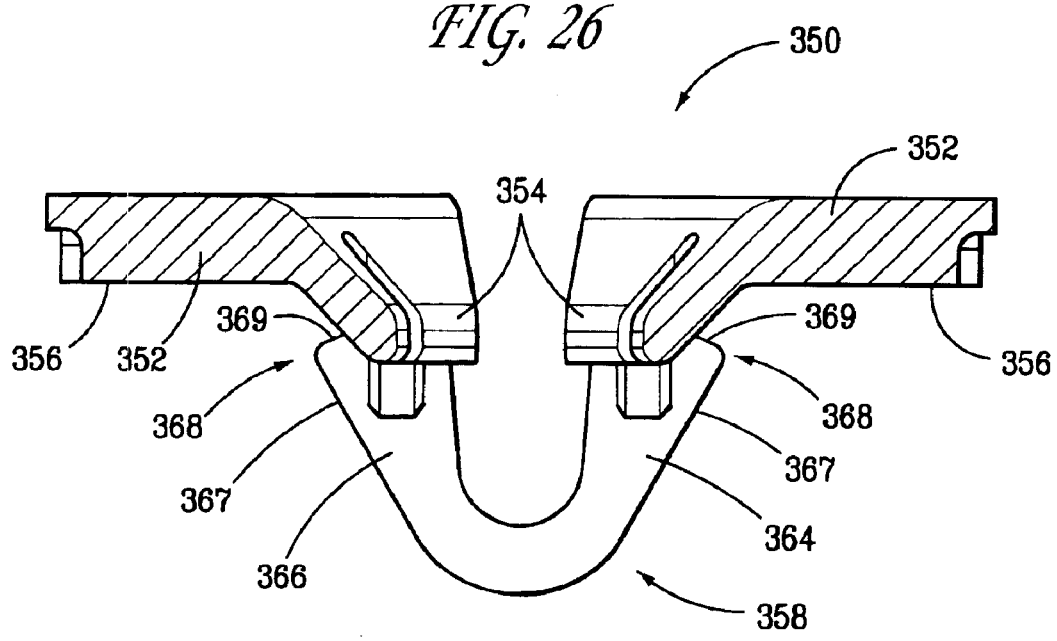
Figure 27:
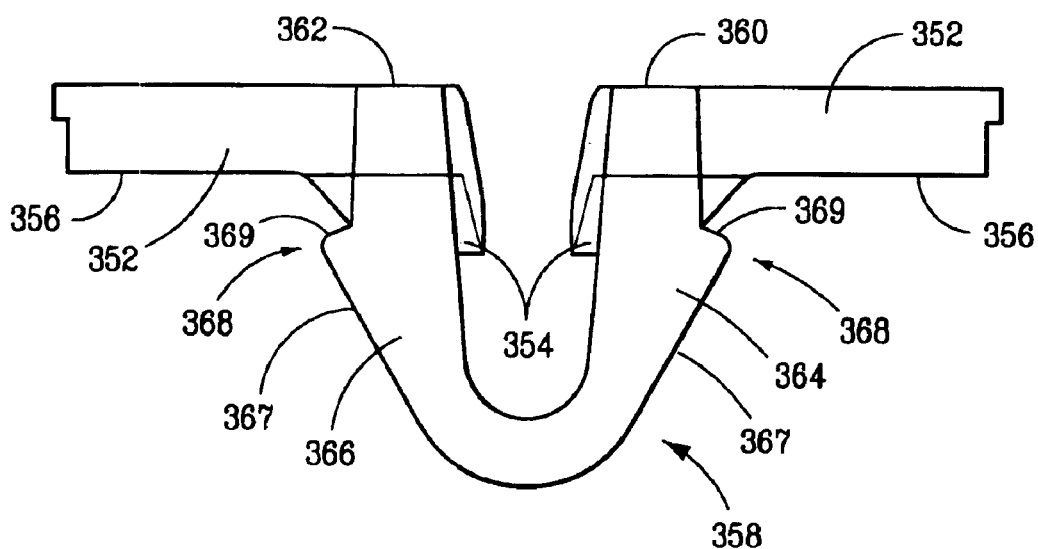

The tether clip system of FIGS. 14–27, also includes releasable fastener means adapted to releasably engage the tether clip 300 to the receptacle 350 when the receptacle is mounted to the second panel 304, the tether clip 300 is mounted to the first panel 302, and the first and second panels 302 and 304 are in a closed configuration relative to one another (see FIGS. 15 and 16). The releasable fastener means is adapted to normally maintain the first and second panels 302, 304 in a closed configuration relative to one another as shown in FIGS. 15 and 16. The receptacle 350 is also in a closed position relative to the tether clip 300 when the first and second panels 302, 304 are in a closed configuration relative to one another. The releasable fastener means allows the receptacle 350 to be released from its closed position relative to the tether clip 300 in response to a force tending to separate the first and second panels 302, 304 that is greater than a first predetermined value. The releasable fastener means is formed in part by portions of the receptacle 350 and in part by portions of the tether clip 300.

The tether clip 300 is formed by an elongated body having a longitudinal axis, a first end 315, a second end 317, and a shoulder 316 located intermediate the first end and the second end. The tether clip 300 has a portion 310 having a first maximum width and located intermediate the shoulder 316 and the second end 317. The tether clip 300 has a portion 326 having a second maximum width greater than the first maximum width and located intermediate the portion 310 having the first maximum width and the second end 317. The tether clip 300 has a portion 338 having a third maximum width less than the second maximum width and located intermediate the portion 326 having the second maximum width and the second end 317. The tether clip 300 has a catch surface 334 that is spaced apart from the portion 326 having the second maximum width. The portion 338 having the third maximum width is located intermediate the portion 326 having the second maximum width and the catch surface 334.

The tether clip 300 also has a pair of resilient snap legs 320 attached to the elongated body at a location along a portion 318 of the elongated body forming the tether clip 300. The portion 318 of the elongated body extends from the shoulder 316 to the first end 315 of the elongated body and includes the first end 315 of the elongated body.

Each of the pair of resilient snap legs 320 has a proximal end and a distal end. Each of the pair of resilient snap legs 320 is attached to the elongated body proximate the proximal end of each of the pair of resilient snap legs 320. Each of the pair of resilient snap legs 320 extends from the proximal end thereof generally in a direction toward a plane coincident with the shoulder 316 and at least in part diverging away from the longitudinal axis of the elongated body forming the tether clip 300.

Each of the pair of resilient snap legs 320 has at least one notch 324 provided proximate the distal end of each of the pair of resilient snap legs 320. The first retaining means 306 includes the pair of resilient snap legs 320. When the first retaining means 306 is secured to the first panel 302, at least a portion of the first panel 302 proximate the first opening 312 is captured between at least a portion of the shoulder 316 and the notch 324 in each of the pair of resilient snap legs 320 to thereby secure the tether clip 300 to the first panel 302.

The receptacle 350 includes two receptacle body portions 352 that are mirror images of one another. The receptacle 350 includes flange-like portions 356 attached to each of the receptacle body portions 352 and adapted to engage a first side of the second panel 304 facing the first panel 302 when the receptacle 350 is mounted to the second panel 304. In the illustrated embodiment, each of the flange-like portions 356 is integral with and forms part of the respective body portion 352.

The receptacle 350 includes two roughly U-shaped leaf spring members 358. Each U-shaped leaf spring member 358 has a first terminus 360 and a second terminus 362. Each U-shaped leaf spring member 358 has a first arm portion 364 adjacent the first terminus 360 and a second arm portion 366 adjacent the second terminus 362. The first terminus 360 of each U-shaped leaf spring member 358 is attached to a respective one of the receptacle body portions 352 and the second terminus 362 of each U-shaped leaf spring member 358 is attached to the other one of the receptacle body portions 352. Each the U-shaped leaf spring member 358 has a projection 368 on each arm member 364, 366. Each projection 368 has an inclined ramp surface 367 on one side and a catch surface 369 on the other side. The catch surface 369 engages a second side of the second panel 304 when the receptacle 350 is mounted to the second panel 304 to thereby secure the receptacle 350 to the second panel 304. The second side of the second panel 304 is opposite the first side of the second panel 304 and in use faces away from the first panel 302.

The receptacle 350 includes at least one resilient finger 354 attached to the receptacle body portion 352. In the illustrated example there are six resilient fingers 354. Each resilient finger 354 is engageable with the portion 310 of the elongated body having the first maximum width to thereby releasably retain the receptacle 350, and consequently the panel 304, in a closed position relative to the tether clip 300.

The portion 310 of the elongated body having the first maximum width and the portion 326 of the elongated body having the second maximum width cooperatively define a depression in the elongated body forming the tether clip 300 that can be engaged by the resilient fingers 354 to thereby releasably retain the receptacle 350 in a closed position relative to the tether clip 300. In the embodiment of FIGS. 14–27, the releasable fastener means includes the resilient fingers 354 and the depression cooperatively defined by the portion 310 of the elongated body having the first maximum width and the portion 326 of the elongated body having the second maximum width.

In the illustrated example, the resilient fingers 354 extend into the opening 314 in plan view when the receptacle 350 is installed in the panel 304. Also the resilient fingers 354 slope down toward the catch surface 334 when the receptacle 350 is in the closed position relative to tether clip 300.

The opening 314 in panel 304 is in the form of a circular opening portion 370 that has a first slot 372 extending from one side and a second 372 extending from the other side. To install the receptacle 350 to the panel 304, the receptacle 350 is positioned over the opening 314 such that the U-shaped leaf spring members 358 are aligned with and positioned at least in part in the slots 372. The receptacle 350 is then pushed in toward the panel 204. As the inclined ramp surfaces of the projections 368 come into contact with the sides of the slots 372, the arms 364 and 366 of the U-shaped leaf spring members 358 are brought together such that the projections 368 clear the slots 372. The receptacle 350 is then pushed in further until the underside of the flange portions 356 contact the first surface of the panel 304. The arm portions 366 of the U-shaped leaf spring members 358 then snap back toward their original positions relative to the arm portions 364 such that the catch surfaces 369 of the projections 268 snap under the second side of the second panel 304 to thereby secure the receptacle 350 to the second panel 304. When the receptacle 350 is secured to the panel 304, portions of the panel 304 around the opening 314 are captured between flange-like portions 356 on one side and the catch surfaces 369 of the projections 368 on the other side to secure the receptacle 350 to the panel 304.

As an example of the use of the tether clip 300, Panel 302 may be the interior panel of the door of a motor vehicle and the panel 304 may be the sheet metal of the door. The retaining means 306 is attached to the panel 302 by pressing in the portion 318 into the hole 312. The sides of the hole 312 deform the snap legs 320. Once the notches 324 clear the panel 302, the snap legs 320 snap open behind the panel 302 to secure the tether clip 300 to the panel 302. The receptacle 350 is installed in the hole 314 of panel 304 as previously described. Once the airbag is in place the second retaining means 308 is pushed through the receptacle 350. The resilient fingers 354 will flex under the pressure of the bulbous portion of the tether clip near the end 317 and the resilient fingers will snap back once the resilient fingers 354 clear the catch surface 334. Because of the angle of the resilient fingers relative to the catch surface 334, pulling the tether clip 300 completely out of receptacle 350 is far more difficult than initially pushing the bulbous end of the tether clip 300 through the receptacle 350. Engagement of the catch surface 334 with the resilient fingers in an attempt to completely pull the tether clip 300 out of the receptacle 350 will actually force the resilient fingers toward the center of the hole 314 and into greater interference with the catch surface 334. Thus, the tether clip 300 is prevented from being pulled completely out of the receptacle 350 unless a force exceeding the second predetermined force is applied to the panels. The panel 304 can now move freely between the retaining means 308 and the portion 326 of the tether clip 300. To secure the panel 302 in its normal position, the larger width portion 326 of the tether clip 300 is snapped through or past the resilient fingers 354. The resilient fingers 354 deform by the action of the gradually widening sides of the portions 338 and 326 of the tether clip to allow the widest part of the portion 326 to pass through the resilient fingers 354. The resilient fingers 354 then snap into the narrowest part of the portion 310 of the tether clip 300 to secure the panel 302 in the normal position of FIGS. 15 and 16.

When the airbag inflates, a force in excess of the first predetermined value and tending to pull the panels apart is created. The ramped surfaces between the narrowest and widest parts of the portions 310 and 326 of the tether clip 300, respectively, spread the resilient fingers 354 apart allowing the receptacle 350 to be released from its closed position relative to the tether clip 300. Thus, the panel 302 is released from the closed position relative to the panel 304. As the airbag inflates further, the catch surface 334 catches the receptacle 350 and consequently the panel 304 and prevents the panel 302 from being pulled completely free from the vehicle door panel 304. Thus, an opening between panels 302 and 304 can be provided for the proper inflation of the airbag without allowing the panel 302 to become a projectile. The resilient fingers 354 are designed such that they fail at forces greater than a second predetermined value that is higher than the forces encountered during airbag deployment. The second predetermined value is usually greater that the first predetermined value. The first predetermined value can range from 10 to 50 lbs., and preferably from about 20 to about 30 lbs., and even more preferably from 20 to 30 lbs. The second predetermined value can be in the range of 75 lbs. and greater, and preferably is in the range of about 150 lbs. and greater, and even more preferably is about 150 lbs. The travel between the panels 302 and 304 during airbag deployment is about 25 mm.

Figure 28:
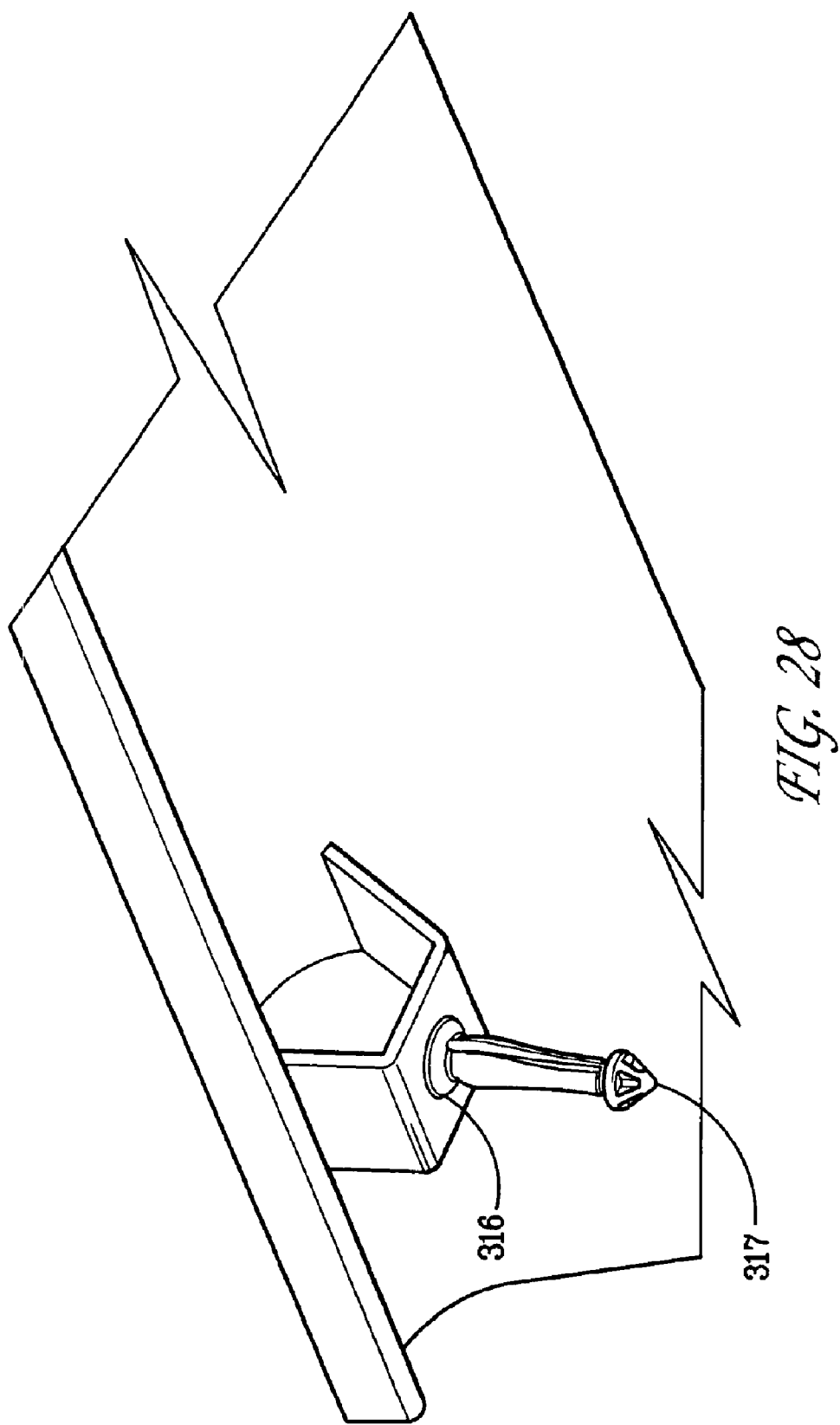
FIG. 28 shows a tether clip integrally made with a panel.

In certain applications it may be possible to make the tether clip 300 integral with the panel 302 such that the panel 302 and the portion of the tether clip 300 extending between the shoulder 316 and the second end 317 are one piece. An example of such an application is seen in FIG. 28.

Figure 29:
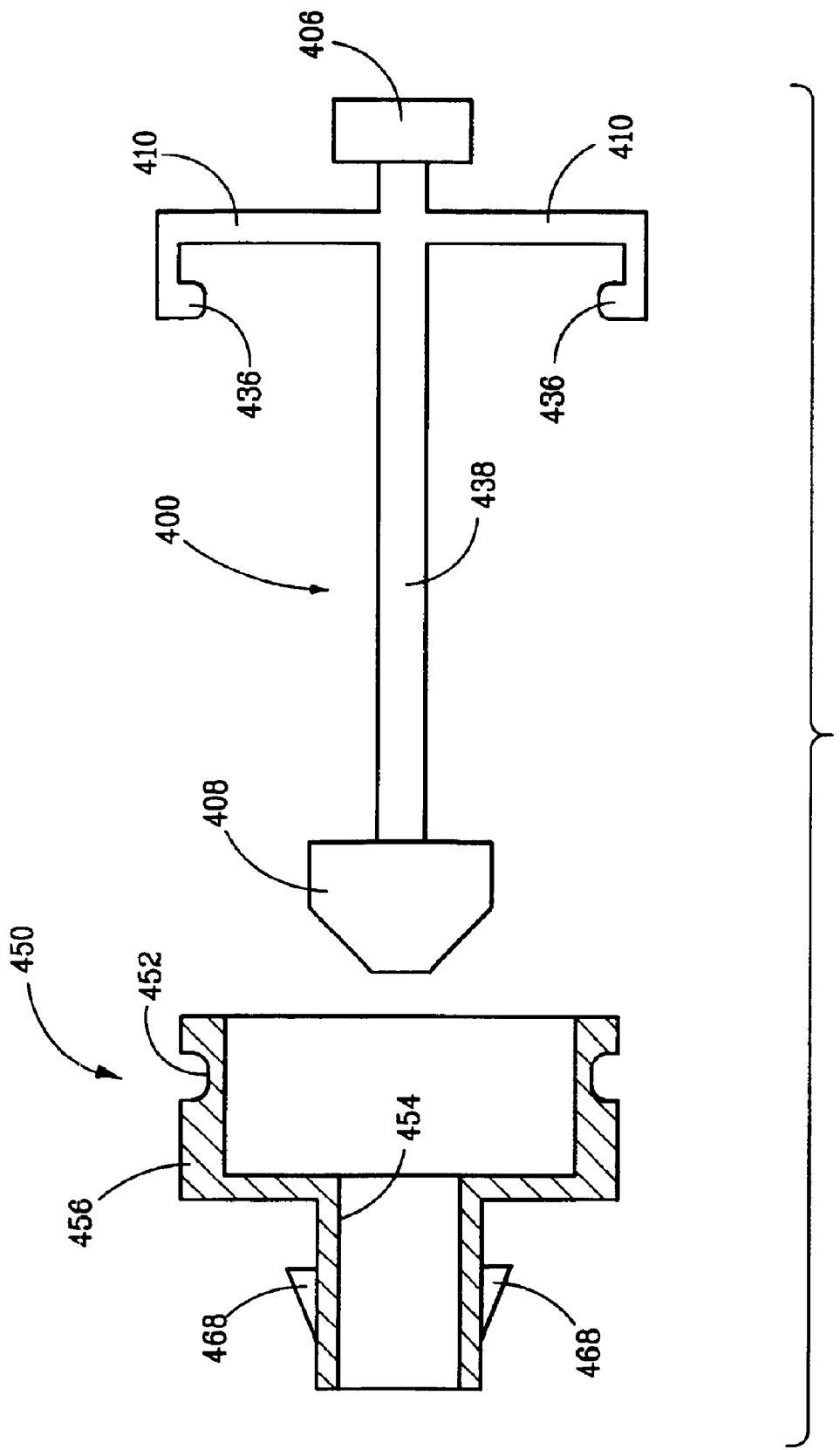
FIG. 29 is a view of a fifth embodiment of a tether clip system according to the present invention.

Referring to FIG. 29, a fifth illustrative embodiment of a tether clip system according to the present invention can be seen. The tether clip system of FIG. 29 includes a tether clip 400 and a receptacle 450. The receptacle 450 has a central passage 454 and projections 468. The projections 468 snap into a panel such as 304. The receptacle 450 has a peripheral groove 452 in a large diameter portion 456 thereof. The tether clip 400 has a quarter-turn fastener 406 at one end and a somewhat pointed bulbous end 408 at the other end. The quarter-turn fastener fits into a slot in a panel such as panel 302 and is turned a quarter of a turn to fasten the tether clip 400 to the panel. The bulbous end 408 can be inserted completely through the passage 454, but can only be pulled out with the greatest difficulty by using a pulling force exceeding the second predetermined value mentioned previously. Projections 436 resiliently, laterally supported by members 410 snap into grooves 452 to releasably maintain two panels in a closed position relative to one another. If the panels are subjected to a force greater than the first predetermined value previously mentioned, the projections 436 snap out of the groove 452, thus releasing the panels relative to one another. The opening between the panels is limited by the bulbous end 408 that is supported at a predetermined distance from the members 410 by the shaft 438. The members 410 may be part of a cylindrical cap that has the shaft 438 attached to its center, and the projections 436 may be formed by an annular inward extending rim or flange.

Referring to FIGS. 30–45, a sixth illustrative embodiment of a tether clip system according to the present invention can be seen. The tether clip system of FIGS. 30–45 includes a tether clip 500, for fastening a first panel 202 relative to a second panel 204, and a receptacle 550 (see FIGS. 9–13 for an illustration of the panels 202 and 204). The tether clip 500 comprises a first retaining means 506 adapted to be securable to the first panel 202; a second retaining means 508 that is engageable with the second panel 204 and limits the relative separation between the first and second panels; and a releasable fastener means 510 intermediate the first and second retaining means 506 and 508. The releasable fastener means 510 is adapted to be releasably engageable with the second panel 204. The releasable fastener means 510 is adapted to normally maintain the first and second panels in a closed configuration relative to one another in a manner similar to that illustrated in reference to the third embodiment shown in FIGS. 10 and 11. The releasable fastener means 510 is designed to release the second panel 204 in response to a force tending to separate the first and second panels that is greater than a first predetermined value, thus allowing the panel 204 to move to the position shown in FIGS. 12 and 13 in reference to the third embodiment.

As was discussed in reference to third embodiment, the first panel 202 has a first opening 212 and the second panel 204 has a second opening 214 (see FIGS. 9–13). The opening 214 is adapted to receive the receptacle 550. The receptacle 550 has a portion 552 defining a receptacle opening 554 that is aligned with the second opening 214 when the receptacle 550 is mounted to the second panel 204. The receptacle 550 further comprises at least one flange-like portion 556 adapted to engage a first side of the second panel 204 facing the first panel 202 when the receptacle 550 is mounted to the second panel 204. The receptacle 550 further comprises a pair of leaf spring members 558. A plate 560 is attached to the receptacle portion 552. Each leaf spring member 558 has an arcuate portion 562 and an arm portion 564. The leaf spring members 558 are made of a resilient material. The arcuate portion 562 of each leaf spring member 558 is attached to the plate 560, and the arm portion 564 of each leaf spring member 558 is attached to its respective arcuate portion 562. The leaf spring members 558 and the plate 560 together define an approximately W-shaped spring structure that has outer arms 564 that can be resiliently flexed relative to the center of the W-shaped spring structure. Each arm portion 564 has a free end 566. Each leaf spring member 558 has a projection 568 on its respective arm portion 564. The projection 568 has an inclined ramp surface 567 on one side and a catch surface 569 on the other side. The catch surface 569 of the projection 568 is engageable to a second side of the second panel 204 opposite the first side of the second panel, when the receptacle 550 is mounted to the second panel 204, to thereby secure the receptacle 550 to the second panel 204 in a manner similar to receptacle 250. The receptacle 550 is secured to the second panel 204 in a manner similar to receptacle 250, except that with the receptacle 550 the catch surfaces 569 engage the second side of the panel 204 on either side of the slot 272. The second side of the panel 204 is the side that faces away from the panel 202 when the two panels are fastened together by the tether clip 500.

As with the receptacle 250, the slot 274 provides clearance for the attachment portion 577 of the tab 578 that is attached to the receptacle portion 552. The tab 578 has a catch surface 580 that contacts the second side of the panel 204 to more strongly retain the receptacle 550 on the panel 204. The receptacle 550 has an optional guide fin 582 that fits into the guide notch 276. The guide notch 276 and guide fin 582 cooperatively help to align the W-shaped spring structure, defined by the leaf spring members 558 and the plate 560, with the slot 272.

To install the receptacle 550 to the panel 204, the receptacle 550 is canted and the tab 578 is positioned in the slot 274 such that the catch surface 580 is positioned under the second side of the panel 204 with the guide fin 582 positioned in the guide notch 276. In this position, the W-shaped spring structure is aligned with and positioned at least in part in the slot 272. The side of the receptacle portion 552 to which the W-shaped spring structure is attached is then pushed in toward the panel 204. As the inclined ramp surfaces 567 of the projections 568 come into contact with the sides of the slot 272, the arm portions 564 are flexed toward the plate 560 such that the projections 568 clear the sides of the slot 272. The side of the receptacle portion 252 to which the W-shaped spring structure is attached is then pushed in further until the underside of the flange portions 556 contact the first surface of the panel 204. The arm portions 564 of the W-shaped spring structure then snap back toward their original positions relative to the plate 560 such that the catch surfaces 569 of the projections 568 snap under the second side of the second panel 204 to thereby secure the receptacle 550 to the second panel 204. When the receptacle 550 is secured to the panel 204, portions of the panel 204 around the opening 214 are captured between flange-like portions 556 on one side and the catch surfaces 569 of the projections 568 and the catch surface 580 of the tab 578 on the other side to secure the receptacle 550 to the panel 204.

An annular shoulder is provided in the bore of the opening 254. In the example of FIGS. 30–45, this annular shoulder is provided by an annular, internal flange 584 provided in the bore of the opening 554. The function of the shoulder in the bore of the opening 554 is explained below.

The first retaining means 506 comprises a shoulder 516; a first body portion 518 projecting from a first side of the shoulder 516 and having an end distal from the shoulder 516. The first body portion 518 has a first longitudinal axis that is coincident with the longitudinal axis of the tether clip 500. The first retaining means 506 further includes a first pair of resilient snap legs 520 attached to the first body portion 518 proximate the end of the first body portion distal from the shoulder 516.

Each of the first pair of resilient snap legs 520 has a proximal end and a distal end. Each of the first pair of resilient snap legs 520 is attached to the first body portion 518 proximate the proximal end of each of the first pair of resilient snap legs. Each of the first pair of resilient snap legs 520 extends from the proximal end thereof generally in a direction toward a plane coincident with the first side 522 of the shoulder 516 and at least in part diverging away from the longitudinal axis of the tether clip 500.

Each of the first pair of resilient snap legs 520 has at least one notch 524 provided proximate the distal end of each of the first pair of resilient snap legs 520. When the first retaining means 506 is secured to the first panel 202, at least a portion of the first panel 202 proximate the first opening 212 is captured between at least a portion of the shoulder 516 and the notch 524 in each of the first pair of resilient snap legs 520 to thereby secure the tether clip 500 to the first panel 202.

The releasable fastener means 510 comprises a second body portion 526 projecting from a second side 528 of the shoulder 516 and has an end distal from the shoulder 516. The second body portion 526 has a second longitudinal axis in line with the first longitudinal axis and thus coincident with the longitudinal axis of the tether clip 500. The releasable fastener means 510 further comprises a second pair of resilient snap legs 530 attached to the second body portion 526 proximate the end of the second body portion distal from the shoulder 516.

Each of the second pair of resilient snap legs 530 has a proximal end and a distal end. Each of the second pair of resilient snap legs 530 is attached to the second body portion 526 proximate the proximal end of each of the second pair of resilient snap legs 530, and a portion of each of the second pair of resilient snap legs 530 extends from proximate the proximal end of each of the second pair of resilient snap legs generally in a direction toward a plane coincident with the second side 528 of the shoulder and that diverges away from the longitudinal axis of the second body portion 526.

Each of the second pair of resilient snap legs 530 has a surface portion 532 proximate the distal end thereof that converges toward the longitudinal axis of the tether clip with decreasing distance from the second side 528 of the shoulder 516. When the releasable fastener means 510 is secured to the second panel 204 via the receptacle 550, at least a portion of the receptacle 550 proximate the receptacle opening 554 is captured between at least a portion of the shoulder 516 and the surface portion 532 proximate the distal end of each of the second pair of resilient snap legs 530 to thereby secure the second panel 204 to the first panel 202 in the closed configuration shown in FIGS. 10 and 11. The surface portion 532 proximate the distal end of each of the second pair of resilient snap legs 530 cooperates with the portion of the receptacle 550 proximate the receptacle opening 554 to bend the second pair of resilient snap legs 530 toward the longitudinal axis of the second body portion 526 to thereby allow the second panel 204 to be released from the releasable fastener means 510, when the releasable fastener means 510 is initially secured to the receptacle 550 installed in the second panel 204 and a force is applied that tends to move the first and second panels apart and that is of a magnitude greater than the first predetermined value.

The second retaining means 508 comprises a third pair of resilient snap legs 536 attached to the releasable fastener means 510 proximate the proximal end of each of the second pair of resilient snap legs 530. The third pair of snap legs 536 extend in a direction away from the shoulder 516 in a fork-like manner. The third pair of resilient snap legs 536 extend on either side of the longitudinal axis of the tether clip 500 and at least in part extend in a direction divergent from the longitudinal axis of the tether clip 500. Each of the third pair of snap legs 536 has a terminating end located distally from the releasable fastener means 510, and each of the third pair of snap legs 536 is provided with a snap hook 538 near the terminating end thereof.

Each snap hook 538 includes a catch surface 540 and a ramp surface 542. The catch surface 540 extends from a respective one of the third pair of resilient snap legs 536. The catch surface 540 is substantially perpendicular to the respective one of the third pair of resilient snap legs 536. The ramp surface 542 extends from the edge, distal from the respective snap leg 536, of the catch surface 540 to the terminating end of the respective one of the third pair of resilient snap legs 536 such that each of the snap hooks 538 has a semi-arrowhead profile as illustrated in FIGS. 31 and 33.

The catch surface 540 of each of the third pair of resilient snap legs 536 can engage at least a portion of the shoulder defined by the flange 584 in the bore of the receptacle opening 554 to limit the separation between the first and second panels 202 and 204 when the second panel 204 is released by the releasable fastener means 510 after being initially secured to the first panel 202 by the releasable fastener means 510. The snap legs 536 will maintain the panel 204 in a position similar to the position shown in FIGS. 12 and 13 as long as any applied force tending to move the first and second panels 202 and 204 further apart is of a magnitude less than a second predetermined value.

The tether clip 500 may be directly fastened to the second panel 204 in the same manner as illustrated in reference to the tether clip of FIGS. 1–3. However, using the receptacle 550 has several advantages. First, the cost and difficulty of providing the complex geometry of the holes such as those in the panels 104 of FIGS. 1–8 is avoided. By having better control over the geometry and materials of the structures that come in contact the releasable fastener means and the second retaining means, the required release force specifications can be more accurately met. The material of the receptacle 550 can be selected for better compatibility with the releasable fastener means and the second retaining means to reduce wear and damage to these parts. Particularly if the panels 104 and 204 are of sheet metal, using the receptacle 550 can prevent contact between the tether clip and sharp edges in the sheet metal that could cause the tether clip to fail.

As an example of the use of the tether clip 500, panel 202 may be the interior panel of the door of a motor vehicle and the panel 204 may be the sheet metal of the door. The retaining means 506 is attached to the panel 202 by pressing in the portion 518 into the hole 212. The sides of the hole 212 deform the snap legs 520. Once the notches 524 clear the panel 202, the snap legs 520 snap open behind the panel 202 to secure the tether clip 500 to the panel 202. The receptacle 550 is installed in the hole 214 of panel 204 as previously described. Once the airbag is in place the snap hooks 538 are pushed through the hole 554 of the receptacle 550. During this operation the sides of the hole 554 act on the ramp surfaces 542 to push the snap hooks 538 closer to the longitudinal axis of the tether clip 500 to allow the snap hooks 538 to pass through the hole 554. Once the snap hooks 538 clear the shoulder in the bore of the hole 554, the snap legs 536 open up and bring the catch surfaces 540 behind the shoulder in the bore of the hole 554 to prevent the tether clip 500 from being pulled completely out of the receptacle 550 unless a force exceeding the second predetermined force is applied to the panels. The panel 204 can now move freely between the retaining means 508 and the releasable fastener means 510. To secure the panel 202 in its normal position, the releasable fastener means 510 is snapped into the hole 554. The snap legs 530 deform by the action of the sides of the hole 554 to allow the snap legs 530 to pass through the hole 554 and open up behind the flange 584 in the opening 554 to secure the panel 202 in the normal position similar to that shown in FIGS. 10 and 11.

When the airbag inflates, a force in excess of the first predetermined value and tending to pull the panels apart is created. The ramped surfaces 532 catch the edges of the hole 554 and/or the edge of the flange 584 in a cam action that bends the snap legs 530 toward the longitudinal axis of the tether clip 500. This allows the insertion process of the releasable fastener means 510 to be reversed and for the releasable fastener means 510 to release the panel 204. As the airbag inflates further, the snap hooks 538 catch the receptacle 550 and consequently the panel 204 and prevent the panel 202 from being pulled completely free from the vehicle door panel 204. Thus, an opening between panels 202 and 204 can be provided for the proper inflation of the airbag without allowing the panel 202 to become a projectile. The snap legs 536 and the snap hooks 538 are designed such that they fail at forces greater than a second predetermined value that is higher than the forces encountered during airbag deployment. The second predetermined value is usually greater that the first predetermined value. The first predetermined value can range from 10 to 50 lbs., and preferably from about 20 to about 30 lbs., and even more preferably from 20 to 30 lbs. The second predetermined value can be in the range of 75 lbs. and greater, and preferably is in the range of about 150 lbs. and greater, and even more preferably is about 150 lbs. The travel between the panels 202 and 204 during airbag deployment is about 25 mm.

Referring to FIGS. 46–57, a seventh illustrative embodiment of a tether clip according to the present invention can be seen. The tether clip 600 of FIGS. 46–57 is used for fastening a first panel (such as panel 102) relative to a second panel (such as panel 104). See FIGS. 1–3 for an illustration of the panels 102 and 104. The tether clip 600 can be used with a first panel that has a first, preferably round, opening, and a second panel that has a second, also preferably round, opening. The tether clip 600 comprises a substantially tubular shell 602, a rod-like insert 604, and a pair of resilient snap legs 606.

The substantially tubular shell 602 has a bore, a first end, and a second end. The tubular shell 602 has a plurality of longitudinal slots 608 and 610 at each of the first end and the second end. Portions of the tubular shell intermediate the plurality of longitudinal slots 608 and 610 form a first plurality of resilient fingers 612 and a second plurality of resilient fingers 614 at the first end and at the second end, respectively. Each resilient finger 612 has a projection 616 on its inner surface. Similarly, each resilient finger 614 has a projection 618 on its inner surface. The tubular shell 602 is provided with at least one longitudinal slot 626 passing through the wall of the tubular shell 602.

The rod-like insert 604 is positioned at least in part within the tubular shell 602. The insert 604 is movable between at least first and second positions illustrated in FIGS. 50–53 and FIGS. 54–57, respectively. The insert has two portions 620 and 622 that act on the projections 616 and 618, respectively. Each of the portions 620 and 622 has a wide middle portion that tapers on either side to a narrow end portion. The insert 604 also has a slot 624 that is accessible through the slot 626 with a tool such as a screwdriver. The slot 624 is shorter than the slot 626.

When the insert 604 is in the positions illustrated in FIGS. 46–49 and 50–53, the narrow end portions of the portions 620 and 622 are in registry with the projections 616 and 618, respectively. In this state the fingers 612 and 614 are in their relaxed state and are spaced relatively close together at their tips. In this relaxed state, the ends of the tether clip 600 can be easily inserted into holes in panels similar to panels 102 and 104.

Once the ends of the tether clip 600 are inserted through the holes in the respective panels, the insert 604 can be moved to the position illustrated in FIGS. 54–57, which is referred to as the installed position. In the installed position, the wide middle portions of the portions 620 and 622 are in registry with the projections 616 and 618, respectively. In this state the fingers 612 and 614 are spread apart such that the ends of the tether clip 600 cannot be pulled out of the holes in their respective panels. The panel retained by the fingers 614 can be relatively moved between the fingers 614 and the pair of resilient snap legs 606. Thus, the panels are tethered together while allowing for a controlled, predetermined amount of separation between the panels.

The pair of resilient snap legs 606 are attached to the tubular shell 602 intermediate the first plurality of resilient fingers 612 and the second plurality of resilient fingers 614. Each of the pair of resilient snap legs 606 has a proximal end and a distal end. Each of the pair of resilient snap legs 606 is attached to the tubular shell 602 proximate the proximal end of each of the pair of resilient snap legs 606. A portion of each of the pair of resilient snap legs 606 extends from proximate the proximal end of each of the pair of resilient snap legs generally in a direction toward the first plurality of resilient fingers 612 while diverging away from the longitudinal axis of the tubular shell 602. Each of the pair of resilient snap legs 606 has a surface portion 628 proximate the distal end thereof that converges toward the longitudinal axis of the tubular shell 602 with decreasing distance from the first end of the tubular shell that includes the resilient fingers 612. The snap legs 606 form the releasable fastener means and function in a manner similar to the releasable fastener means 510, 210, and 110. When the snap legs 606 are snapped into the hole in the panel retained by the fingers 614, the panels are releasably secured in the closed configuration. When a force exceeding the first predetermined value is applied, the panels can be moved apart the desired distance while remaining tethered together.

The first retaining means includes the first plurality of resilient fingers 612 and the insert portion 620. The second retaining means includes the second plurality of resilient fingers 614 and the insert portion 622.

The tether clip 600 can have an optional shoulder 630 that functions identically to the shoulders 516, 216 and 116 and is positioned intermediate the first plurality of resilient fingers 612 and the pair of resilient snap legs 606.

Referring to FIGS. 58–64, an eighth embodiment of the tether clip 700 can be seen. The tether clip 700 has an elongated body 702 having a first end and a second end. The elongated body has a first arrowhead-shaped portion 704 at the first end is thereof. The elongated body has a second arrowhead-shaped portion 706 at the second end thereof. The elongated body has a longitudinal axis extending from a vertex of the first arrowhead-shaped portion 704 to a vertex of the second arrowhead-shaped portion 706. The first arrowhead-shaped portion 704 has a curved cross section taken in a plane perpendicular to the longitudinal axis of the elongated body 702. The second arrowhead-shaped portion 706 has a curved cross section taken in a plane perpendicular to the longitudinal axis of the elongated body 702.

The tether clip 700 also has a pair of resilient snap legs 708 attached to the elongated body intermediate the first arrowhead-shaped portion 704 and the second arrowhead-shaped portion 706. The first retaining means includes the first arrowhead-shaped portion 704, the second retaining means includes the second arrowhead-shaped portion 706, and the releasable fastener means includes the pair of resilient snap legs 708.

Each of the pair of resilient snap legs 708 has a proximal end and a distal end. Each of the pair of resilient snap legs 708 is attached to the elongated body proximate the proximal end of each of the pair of resilient snap legs. A portion of each of the pair of resilient snap legs 708 extends from proximate the proximal end of each of the pair of resilient snap legs generally in a direction toward the first arrowhead-shaped portion and diverging away from the longitudinal axis of the elongated body. Each of the pair of resilient snap legs has a surface portion 710 proximate the distal end thereof that converges toward the longitudinal axis of the elongated body 702 with decreasing distance from the first arrowhead-shaped portion 704. The snap legs 708 function in a similar manner to the snap legs 606, 530, 230, and 130. When the releasable fastener means is secured to the second panel at least a portion of the second panel is captured intermediate the first panel and the surface portion proximate the distal end of each of the pair of resilient snap legs to thereby secure the second panel to the first panel in the closed configuration. The surface portion proximate the distal end of each of the second pair of resilient snap legs cooperates with a portion of the second panel proximate the second opening to bend the pair of resilient snap legs toward the longitudinal axis of the elongated body to thereby allow the second panel to be released from the releasable fastener means when the tether clip is mounted to the first panel, the releasable fastener means is initially secured to the second panel with the first and second panels in the closed configuration, and a force is applied that tends to move the first and second panels apart and that is of a magnitude greater than the first predetermined value.

It is to be understood that the present invention is not limited to the embodiments described above, but includes any and all embodiments within the scope of the appended claims. Furthermore, it is to be understood that the embodiments of the present invention disclosed above are susceptible to various modifications, changes and adaptations by those skilled in the art, without departing from the spirit and scope of the invention.

What is claimed is:

1. A tether clip for fastening a first panel relative to a second panel, the first panel having a first opening and the second panel having a second opening, the tether clip comprising:

a first retaining means adapted to be securable to the first panel, said first retaining means comprising:
a shoulder;
a first body portion projecting from a first side of said shoulder and having an end distal from said shoulder, said first body portion having a first longitudinal axis; and
a first pair of resilient snap legs attached to said first body portion proximate said end of said first body portion distal from said shoulder;
a second retaining means that is engageable with the second panel and limits the relative separation between the first and second panels; and
a releasable fastener means intermediate said first and second retaining means and being adapted to be releasably engageable with the second panel, said releasable fastener means being adapted to normally maintain the first and second panels in a closed configuration relative to one another, and wherein said releasable fastener means releases the second panel in response to a force tending to separate the first and second panels that is greater than a first predetermined value,
said releasable fastener means comprising:
a second body portion projecting from a second side of said shoulder and having an end distal from said shoulder, said second body portion having a second longitudinal axis in line with said first longitudinal axis; and
a second pair of resilient snap legs attached to said second body portion proximate said end of said second body portion distal from said shoulder, each of said second pair of resilient snap legs having a proximal end and a distal end, each of said second pair of resilient snap legs being attached to said second body portion proximate said proximal end of each of said second pair of resilient snap legs,
wherein said second retaining means comprises:
a third pair of resilient snap legs attached to said releasable fastener means proximate said proximal end of each of said second pair of resilient snap legs, said third pair of snap legs extending away from said shoulder in a fork-like manner, each of said third pair of snap legs having a terminating end located distally from said releasable fastener means, and each of said third pair of snap legs being provided with a snap hook near said terminating end thereof.

2. The tether clip according to claim 1, wherein each said snap hook comprises:

a catch surface extending from a respective one of said third pair of resilient snap legs, said catch surface being substantially perpendicular to said respective one of said third pair of resilient snap legs; and a ramp surface extending from said catch surface to said terminating end of said respective one of said third pair of resilient snap legs such that each said snap hook has a semi-arrowhead profile.

3. The tether clip according to claim 2, wherein a portion of each of said second pair of resilient snap legs extends from proximate said proximal end of each of said second pair of resilient snap legs generally in a direction toward a plane coincident with said second side of said shoulder and diverging away from said second longitudinal axis, and wherein each of said second pair of resilient snap legs has a surface portion proximate said distal end thereof that converges toward said second longitudinal axis with decreasing distance from said second side of said shoulder, wherein when said releasable fastener means is secured to the second panel at least a portion of the second panel proximate the second opening is captured between at least a portion of said shoulder and said surface portion proximate said distal end of each of said second pair of resilient snap legs to thereby secure the second panel to the first panel in the closed configuration, and wherein said surface portion proximate said distal end of each of said second pair of resilient snap legs cooperates with the portion of the second panel proximate the second opening to bend said second pair of resilient snap legs toward said second longitudinal axis to thereby allow the second panel to be released from said releasable fastener means when said releasable fastener means is initially secured to the second panel and then a force tending to move the first and second panels apart and of a magnitude greater than said first predetermined value is applied.

4. A tether clip system for fastening a first panel having a first opening in a closed configuration relative to a second panel having a second opening, the tether clip system comprising:

a receptacle adapted for mounting to the second opening in the second panel; and a tether clip comprising:

a first retaining means adapted to be securable to the first panel, said first retaining means comprising:

a shoulder;

a first body portion projecting from a first side of said shoulder and having an end distal from said shoulder, said first body portion having a first longitudinal axis; and a first pair of resilient snap legs attached to said first body portion proximate said end of said first body portion distal from said shoulder;

a second retaining means that engages with said receptacle when said receptacle is mounted to the second panel, said tether clip is mounted to said first panel, and the first and second panels are in an open configuration relative to one another, in order to limit the relative separation between the first and second panels; and a releasable fastener means adapted to releasably engage said tether clip to said receptacle when said receptacle is mounted to the second panel, said tether clip is mounted to said first panel, and the first and second panels are in a closed configuration relative to one another, said releasable fastener means being adapted to normally maintain the first and second panels in a closed configuration relative to one another wherein said receptacle is also in a closed position relative to said tether clip, and wherein said releasable fastener means allows said receptacle to be released from its closed position relative to said tether clip in response to a force tending to separate the first and second panels that is greater than a first predetermined value, said releasable fastener means comprising:

a second body portion projecting from a second side of said shoulder and having an end distal from said shoulder, said second body portion having a second longitudinal axis in line with said first longitudinal axis; and a second pair of resilient snap legs each attached at a proximal end thereof to said second body portion proximate said end of said second body portion distal from said shoulder, wherein said second retaining means comprises:

a third pair of resilient snap legs attached to said releasable fastener means proximate said proximal end of each of said second pair of resilient snap legs, said third pair of snap legs extending away from said shoulder in a fork-like manner, each of said third pair of snap legs having a terminating end located distally from said releasable fastener means, and each of said third pair of snap legs being provided with a snap hook near said terminating end thereof.

5. The tether clip system according to claim 4, wherein each of said first pair of resilient snap legs has a proximal end and a distal end, each of said first pair of resilient snap legs is attached to said first body portion proximate said proximal end of each of said first pair of resilient snap legs, and each of said first pair of resilient snap legs extends from said proximal end thereof generally in a direction toward a plane coincident with said first side of said shoulder and at least in part diverging away from said first longitudinal axis.

6. The tether clip system according to claim 5, wherein each of said first pair of resilient snap legs has at least one notch provided proximate said distal end of each of said first pair of resilient snap legs, wherein when said first retaining means is secured to the first panel at least a portion of the first panel proximate the first opening is captured between at least a portion of said shoulder and said notch in each of said first pair of resilient snap legs to thereby secure the tether clip to the first panel.

7. The tether clip system according to claim 4, wherein each of said second pair of resilient snap legs has a distal end in addition to said proximal end thereof, each of said second pair of resilient snap legs is attached to said second body portion proximate said proximal end of each of said second pair of resilient snap legs, and a portion of each of said second pair of resilient snap legs extends from proximate said proximal end of each of said second pair of resilient snap legs generally in a direction toward a plane coincident with said second side of said shoulder and diverging away from said second longitudinal axis.

8. The tether clip system according to claim 7, wherein each of said second pair of resilient snap legs has a surface portion proximate said distal end thereof that converges toward said second longitudinal axis with decreasing distance from said second side of said shoulder, wherein when said releasable fastener means is secured to said receptacle at least a portion of said receptacle is captured between at least a portion of said shoulder and said surface portion proximate said distal end of each of said second pair of resilient snap legs to thereby secure the second panel to the first panel in the closed configuration, and wherein said surface portion proximate said distal end of each of said second pair of resilient snap legs cooperates with said at least a portion of said receptacle to bend said second pair of resilient snap legs toward said second longitudinal axis to thereby allow the second panel to be released from said releasable fastener means when said tether clip is mounted to the first panel, said receptacle is mounted to the second panel, said releasable fastener means is initially secured to said receptacle with the first and second panels in said closed configuration, and a force tending to move the first and second panels apart and of a magnitude greater than said first predetermined value is applied.

9. A tether clip for fastening a first panel relative to a second panel, the tether clip comprising:

a first body portion having a first longitudinal axis;

a second body portion having a second longitudinal axis in line with said first longitudinal axis, said second body portion having an end distal from said first body portion, said first body portion having an end distal from said second body portion;

a first pair of resilient snap legs attached to said first body portion proximate said end of said first body portion distal from said second body portion, said first pair of resilient snap legs being adapted to be securable to the first panel;

a second pair of resilient snap legs attached to said second body portion proximate said end of said second body portion distal from said first body portion, each of said second pair of resilient snap legs having a proximal end and a distal end, each of said second pair of resilient snap legs being attached to said second body portion proximate said proximal end of each of said second pair of resilient snap legs, said second pair of resilient snap legs being adapted to be releasably engageable with the second panel, said second pair of resilient snap legs being adapted to normally maintain the first and second panels in a closed configuration relative to one another, and wherein said second pair of resilient snap legs release the second panel in response to a force tending to separate the first and second panels that is greater than a first predetermined value; and a third pair of resilient snap legs each extending from proximate said proximal end of a respective one of said second pair of resilient snap legs, said third pair of resilient snap legs extending away from said first body portion in a fork-like manner, each of said third pair of resilient snap legs having a terminating end located distally from said second body portion, and each of said third pair of resilient snap legs being provided with a snap hook near said terminating end thereof, said third pair of resilient snap legs being engageable with the second panel to limit the relative separation between the first and second panels when the first and second panels are in an open configuration.

* * * * *